US012748442B2

(12) United States Patent
Xiong

(10) Patent No.: US 12,748,442 B2
(45) Date of Patent: Sep. 29, 2026

(54) FLYING APPARATUS, AIRCRAFT, AND METHOD FOR CONTROLLING FLIGHT OF FLYING APPARATUS

(71) Applicant: Xiaowei Xiong, Greenwich, CT (US)

(72) Inventor: Xiaowei Xiong, Greenwich, CT (US)

(73) Assignee: Xiaowei Xiong, Greenwich, CT (US)

( * ) Notice: Subject to any disclaimer, the term of this patent is extended or adjusted under 35 U.S.C. 154(b) by 0 days.

(21) Appl. No.: 18/922,362

(22) Filed: Oct. 21, 2024

(65) Prior Publication Data

US 2025/0172947 A1 May 29, 2025

Related U.S. Application Data

(60) Provisional application No. 63/620,795, filed on Jan. 13, 2024, provisional application No. 63/602,443, filed on Nov. 24, 2023.

(51) Int. Cl.

| | |
|---|---|
| ***G05D 1/652*** | (2024.01) |
| ***B64C 29/00*** | (2006.01) |
| *G05D 109/22* | (2024.01) |

(52) U.S. Cl.

CPC ......... *G05D 1/652* (2024.01); *B64C 29/0033* (2013.01); *G05D 2109/24* (2024.01)

(58) Field of Classification Search

CPC ......... B64C 15/12; B64C 27/22; B64C 27/28; B64C 27/52; B64C 29/00; B64C 29/0008; B64C 29/0016; B64C 29/0033; B64C 29/0041; B64C 29/0075; B64C 29/02; B64C 29/04; G05D 1/652; G05D 2109/20; G05D 2109/22; G05D 2109/23; G05D 2109/24; G05D 2109/25; G05D 2109/254

(Continued)

(56) References Cited

U.S. PATENT DOCUMENTS 3,090,581 A * 5/1963 Einarsson .............. B64C 37/00 244/48
3,181,810 A * 5/1965 Olson ................. B64C 29/0033 244/66

(Continued)

FOREIGN PATENT DOCUMENTS

CN 104417750 A 3/2015
CN 109606673 A 4/2019

(Continued)

OTHER PUBLICATIONS

The extended European search report of Application No. 24210904.9 issued on Mar. 24, 2025, (11p).

(Continued)

*Primary Examiner* — Joshua E Rodden
(74) *Attorney, Agent, or Firm* — Arch & Lake LLP

(57) ABSTRACT

A flying apparatus, an aircraft, and a method for controlling flight of a flying apparatus are provided. The flying apparatus may include a frame, including a front section and a rear section; a front tiltrotor, disposed on the front section of the frame; and a rear tiltrotor, disposed on the rear section of the frame; wherein the front tiltrotor is configured to tilt at a front tilt angle to a gravity direction to control a flight of the flying apparatus, and the rear tiltrotor is configured to tilt at a rear tilt angle to the gravity direction to control the flight of the flying apparatus.

19 Claims, 19 Drawing Sheets

200

(58) Field of Classification Search
USPC .......................................................... 244/7 R
See application file for complete search history.

(56) References Cited

U.S. PATENT DOCUMENTS 4,537,372 A 8/1985 Forizs
5,746,390 A * 5/1998 Chiappetta .......... B64C 29/0025 244/12.6
7,137,589 B2 * 11/2006 Arata ...................... B64C 27/26 244/6
8,016,226 B1 * 9/2011 Wood .................. B64C 29/0033 244/23 B
8,496,200 B2 * 7/2013 Yoeli ................... B64C 29/0025 244/23 B
8,646,720 B2 * 2/2014 Shaw .................. B64C 29/0025 244/17.23
9,045,226 B2 * 6/2015 Piasecki .................. B64C 37/00
9,085,355 B2 7/2015 DeLorean
9,254,916 B2 * 2/2016 Yang ....................... B64C 3/546
10,086,956 B2 * 10/2018 O'Brien ............... G03B 15/006
10,124,890 B2 * 11/2018 Sada-Salinas ...... B64C 29/0025
10,526,083 B2 * 1/2020 Shaw ..................... B64U 10/13
10,589,838 B1 * 3/2020 Suppes ................. B64C 27/001
10,676,188 B2 * 6/2020 Campbell ............... B64C 27/26
11,242,141 B2 2/2022 Yoeli
11,433,998 B2 * 9/2022 Tian ....................... B64U 60/50
11,492,106 B2 * 11/2022 Noppel ................... B64C 39/08
11,535,371 B2 * 12/2022 Moore .................... B64C 27/82
11,673,661 B2 * 6/2023 Vondrell .............. B64D 27/357 239/302
11,673,663 B2 6/2023 Benedict et al.
11,780,576 B1 * 10/2023 Groninga .................. B64C 3/00 244/6
12,030,626 B2 * 7/2024 Moore .................... B64C 13/28
12,084,177 B2 * 9/2024 Sathya ................. G05D 1/0088
2003/0080242 A1 * 5/2003 Kawai ................... B64C 11/001 244/12.4
2004/0245374 A1 * 12/2004 Morgan ............. B64C 29/0025 244/12.3
2009/0084890 A1 * 4/2009 Reinhardt ........... B64C 29/0033 244/12.4
2010/0051740 A1 3/2010 Yoeli
2013/0175404 A1 * 7/2013 Shefer ..................... B64C 15/14 244/7 A
2015/0298800 A1 10/2015 Yoon
2017/0217584 A1 * 8/2017 Elfeky .................... B64C 27/56
2018/0044000 A1 * 2/2018 Venturelli ............. B64C 25/405
2018/0126871 A1 * 5/2018 Martinotti ............... B60L 15/36
2018/0155021 A1 * 6/2018 Patterson .................. B64C 3/00
2018/0257448 A1 9/2018 Schreiner
2018/0370625 A1 * 12/2018 Netzer ................ B64C 29/0033
2019/0127056 A1 * 5/2019 Weekes ............... B64C 29/0025
2019/0152593 A1 * 5/2019 Castellano Aldave ...................... B64C 29/0033
2019/0375259 A1 * 12/2019 Stadler ..................... B60K 1/04
2020/0140079 A1 * 5/2020 Campbell .............. B64D 27/34
2020/0140081 A1 * 5/2020 Levy ........................ B64C 13/16
2020/0156781 A1 * 5/2020 Kroo ................... B64C 29/0033
2020/0317332 A1 * 10/2020 Didey ..................... B64C 39/08
2020/0391858 A1 * 12/2020 Snider .................... B64D 31/06
2022/0097838 A1 * 3/2022 Amante ................ B64C 11/001
2022/0363376 A1 * 11/2022 Dolejsi ................... B64C 39/08
2023/0339610 A1 * 10/2023 Moore ................... B64D 27/31
2024/0051688 A1 * 2/2024 Valero ..................... B64C 39/08

FOREIGN PATENT DOCUMENTS

CN 216443785 U 11/2021
CN 116176192 A 3/2023
CN 223371134 U 9/2025
EP 3434592 A1 * 1/2019 ............. B64C 39/08
EP 3647193 A1 * 5/2020 ............. B64C 39/08
ES 2775773 A1 * 7/2020 ............. B64C 39/12
WO 2015124556 A1 8/2015
WO 2019211875 A1 7/2019

OTHER PUBLICATIONS

The first CNOA issued in Application No. 202411673803.3 dated Jul. 28, 2027, with machine translation, (p. 12).
The first Search Report issued in Application No. 202411673803.3 dated Jul. 24, 2027, with machine translation, (p. 6).

* cited by examiner

FLYING APPARATUS, AIRCRAFT, AND METHOD FOR CONTROLLING FLIGHT OF FLYING APPARATUS

CROSS-REFERENCE TO RELATED APPLICATIONS

The application is based upon and claims priority to U.S. Provisional Application No. 63/620,795 U.S. filed on Jan. 13, 2024, and U.S. Provisional Application No. 63/602,443 filed on Nov. 24, 2023, all entitled "Method of a fixed wing vertical takeoff and landing aircraft with tandem tiltrotors," the entire disclosures of which are incorporated herein by reference for all purposes.

BACKGROUND

Vertical Take-off and Landing (VTOL) aircraft play a crucial role in various industries, including transportation, emergency services, and military operations. Conventionally, VTOL aircraft have been configured with fixed propellers for both vertical takeoff and forward propulsion. While this configuration offers a degree of stability, it is plagued by limitations in flight duration, speed, and efficiency. Additionally, the failure of a lift-providing propeller may lead to balance issues and potential accidents, posing significant safety concerns.

In an effort to address these challenges, certain VTOL aircraft designs incorporate horizontal tiltrotors positioned at each wing's end. This configuration enables VTOL capability and facilitates swift forward flight. However, the introduction of tiltrotors introduces its own set of challenges, including balance disturbances during flight state transitions. While some multi-tiltrotor aircraft have improved safety to some extent, the incorporation of tiltrotors often comes at the cost of reduced overall efficiency. Moreover, the failure of one propeller in this arrangement may lead to balance issues and catastrophic accidents, further exacerbating safety risks.

Traditional helicopters, including rescue helicopters, typically feature large rotor diameters, which limit their application in narrow urban environments. Additionally, the current cost of VTOL aircraft is notably high due to the expense of the power system and transmission system.

SUMMARY

Examples of the present disclosure provide a flying apparatus, an aircraft, and a method for controlling flight of a flying apparatus.

According to a first aspect of the present disclosure, a flying apparatus is provided. The flying apparatus may include: a frame, comprising a front section and a rear section; a front tiltrotor, disposed on the front section of the frame; and a rear tiltrotor, disposed on the rear section of the frame. The front tiltrotor is configured to tilt at a front tilt angle to a gravity direction to control a flight of the flying apparatus. The rear tiltrotor is configured to tilt at a rear tilt angle to the gravity direction to control the flight of the flying apparatus.

According to a second aspect of the present disclosure, an aircraft is provided. The aircraft may include: a flying apparatus configured to carry a vehicle. The flying apparatus includes: a frame, comprising a front section and a rear section; a front tiltrotor, disposed on the front section of the frame; and a rear tiltrotor, disposed on the rear section of the frame. The front tiltrotor is configured to tilt at a front tilt angle to a gravity direction to control a flight of the flying apparatus. The rear tiltrotor is configured to tilt at a rear tilt angle to the gravity direction to control the flight of the flying apparatus.

According to a third aspect of the present disclosure, a method for controlling flight of a flying apparatus is provided. The method may include: receiving an instruction reflecting a flight trajectory from a control terminal; and controlling a front tilt angle, a front rotation speed, and a front rotation direction of a front tiltrotor, and a rear tilt angle, a rear rotation speed, and a rear rotation direction of a rear tiltrotor, according to the instruction; wherein the front tiltrotor is disposed on a front section of a frame; and the rear tiltrotor is disposed on a rear section of the frame; wherein the front tiltrotor is configured to tilt at the front tilt angle to a gravity direction to control a flight of the flying apparatus, and the rear tiltrotor is configured to tilt at the rear tilt angle to the gravity direction to control the flight of the flying apparatus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Figure 1A:
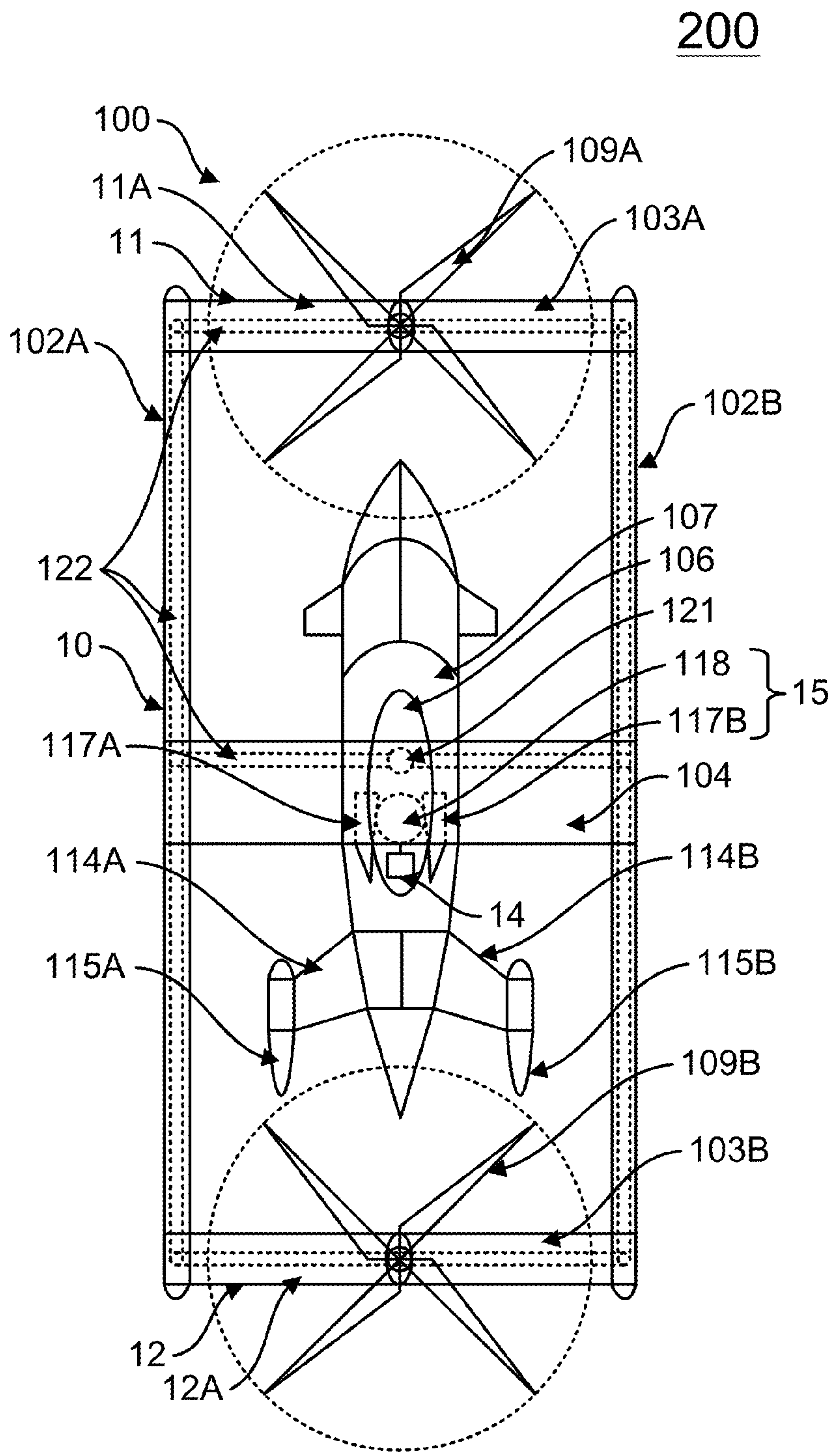
FIG. 1*a* illustrates an overhead perspective of a VTOL aircraft in its VTOL configuration in accordance with some implementations of the present disclosure.
Figure 2A:
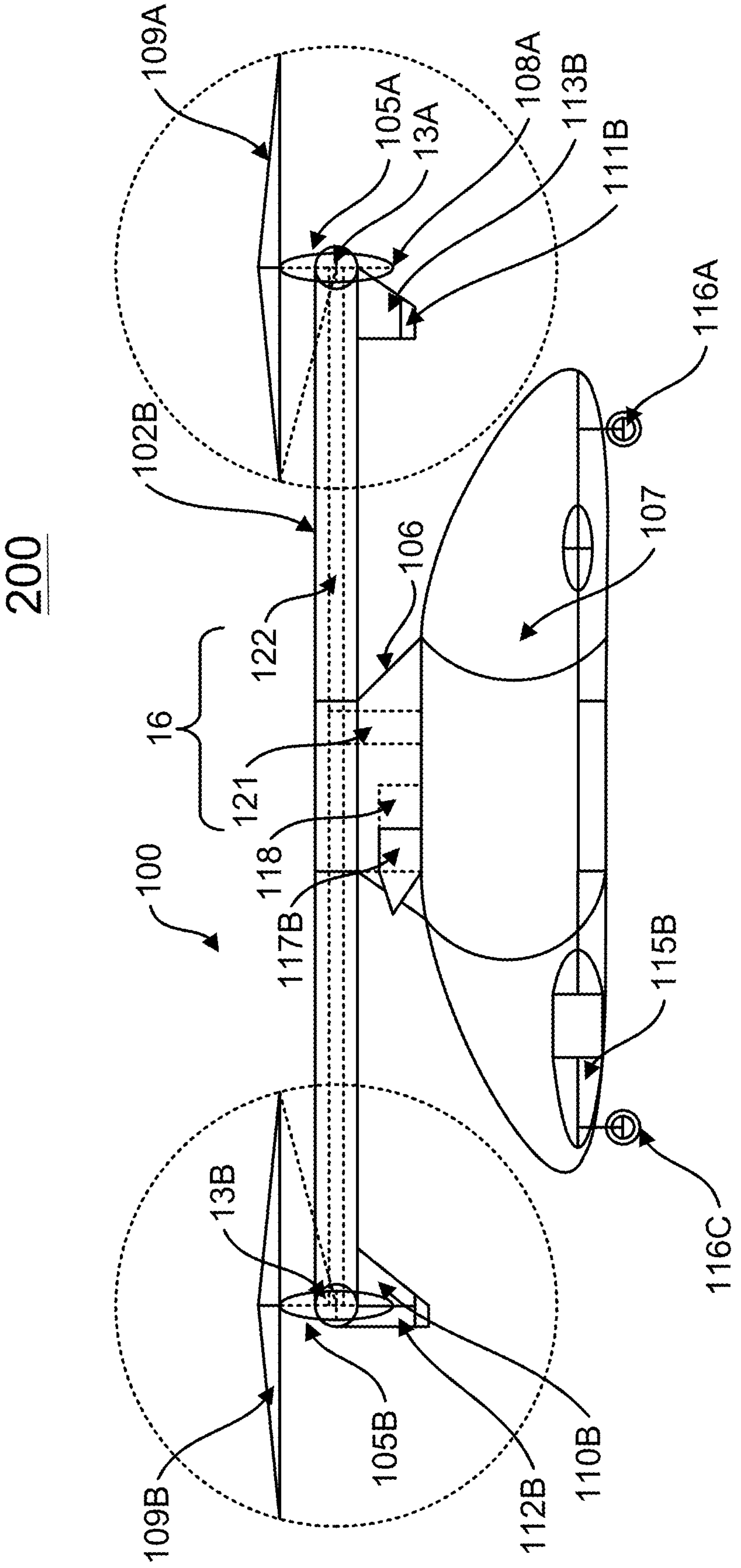
FIG. 2*a* illustrates a lateral view of a VTOL aircraft in its VTOL configuration in accordance with some implementations of the present disclosure.

In the present disclosure, a flying apparatus is provided. The flying apparatus is a device, aerial vehicle, or machine designed to achieve flight through the air. In some embodiments of the present disclosure, the flying apparatus may be a part of an aircraft and configured to carry a vehicle. As shown in FIG. 1*a* and FIG. 2*a*, the flying apparatus 100 includes a frame 10, a front tiltrotor 105A, and a rear tiltrotor 105B. The frame 10 includes a front section 11 and a rear section 12. The front tiltrotor 105A is disposed on the front section 11 of the frame 10. The rear tiltrotor 105B is disposed on the rear section 12 of the frame 10. The front tiltrotor 105A is configured to tilt at a front tilt angle to a gravity direction to control a flight of the flying apparatus 100, and the rear tiltrotor 105B is configured to tilt at a rear tilt angle to the gravity direction to control the flight of the flying apparatus. In some embodiments, the front section 11 may be a front rotor-fixing support 103A and the rear section 12 may be a rear rotor-fixing support 103B, and the frame 10 further includes: at least one main wing 104 disposed between the front rotor-fixing support 103A and the rear rotor-fixing support 103B, and a linear support 102 configured to connect and fix the front rotor-fixing support 103A, the at least one main wing 104, and the rear rotor-fixing support 103B.

In some embodiments of the present disclosure, as shown in FIG. 2A, the front tiltrotor 105A includes a front tilting axis 13A that is generally parallel to an upper surface 11A of the front section 11, or the rear tiltrotor 105B includes a rear tilting axis 13B that is generally parallel to an upper surface 12A of the rear section 12.

In some embodiments of the present disclosure, at least one of the front tiltrotor 105A and the rear tiltrotor 105B is configured to tilt generally perpendicular to a ground level to drive taking off or landing vertically, or tilt generally parallel to the ground level to drive the flying apparatus take off, fly forward or backward.

In some embodiments of the present disclosure, the flying apparatus further includes a controller 14 configured to ensure that the front tiltrotor 105A and the rear tiltrotor 105B have identical rotation speeds and opposite rotation directions. In some embodiments, the controller 14 controls the front tiltrotor 105A and the rear tiltrotor 105B to tilt synchronically according to micromotors. However, in some other embodiments, the flying apparatus 100 may be controlled by an external control terminal, or the flying apparatus 100 is self-controlled by the controller 14.

FIG. 1*a* and FIG. 2*a* illustrate an embodiment of a fixed wing VTOL aircraft 200 with a linear support 102, a rotor-fixing support 103, a main wing 104, a tiltrotor system 105, a wing platform complex 106 and a vehicle 107. The linear support 102 includes a left linear support 102A and a right linear support 102B, either of which is configured to connect and fix a front rotor-fixing support 103A, the main wing 104, and a rear rotor-fixing support 103B. The main wing 104 may have the same length as the rotor-fixing support 103, the tiltrotor system 105 includes the front tiltrotor 105A, the rear tiltrotor 105B, and related gears and nacelles. In some embodiments of the present disclosure, more than one main wing 104 would be disposed between the front rotor-fixing support 103A and the rear rotor-fixing support 103B. In some embodiments of the present disclosure, the vehicle may be a fuselage 107. However, the detailed type and function of the vehicle are not limited to the embodiments of the present disclosure.

Continuing to refer to FIG. 1*a* and FIG. 2*a*, the left linear support 102A and right linear support 102B are arranged in parallel and symmetry. The front rotor-fixing support 103A connected to the front ends of the left linear support 102A and right linear support 102B, while the rear rotor-fixing support 103B connected to the rear ends of the left linear support 102A and right linear support 102B. The main wing 104 is connected to the middle sections of the left linear support 102A and right linear support 102B. The front tiltrotor 105A is positioned on the middle section of the front rotor-fixing supports 103A and the rear tiltrotor 105B is positioned on the middle section of the rear rotor-fixing support 103B in a tandem manner. The front tiltrotor 105A and rear tiltrotor 105B may tilt synchronically along the longitudinal axes of the front and rear rotor-fixing supports, respectively.

Figure 3A:
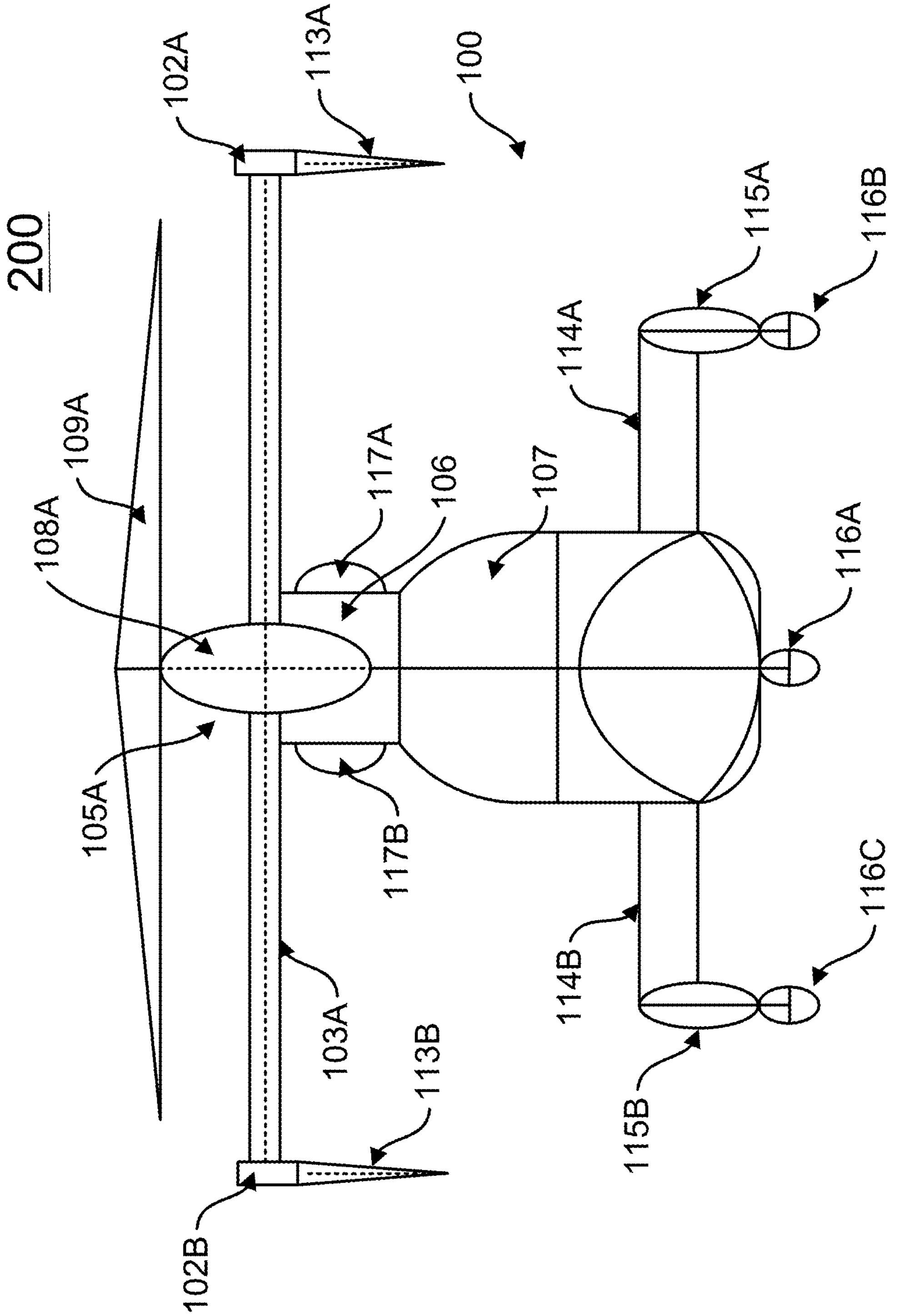
FIG. 3*a* illustrates a frontal view of a VTOL aircraft in its VTOL configuration in accordance with some implementations of the present disclosure.
Figure 3B:
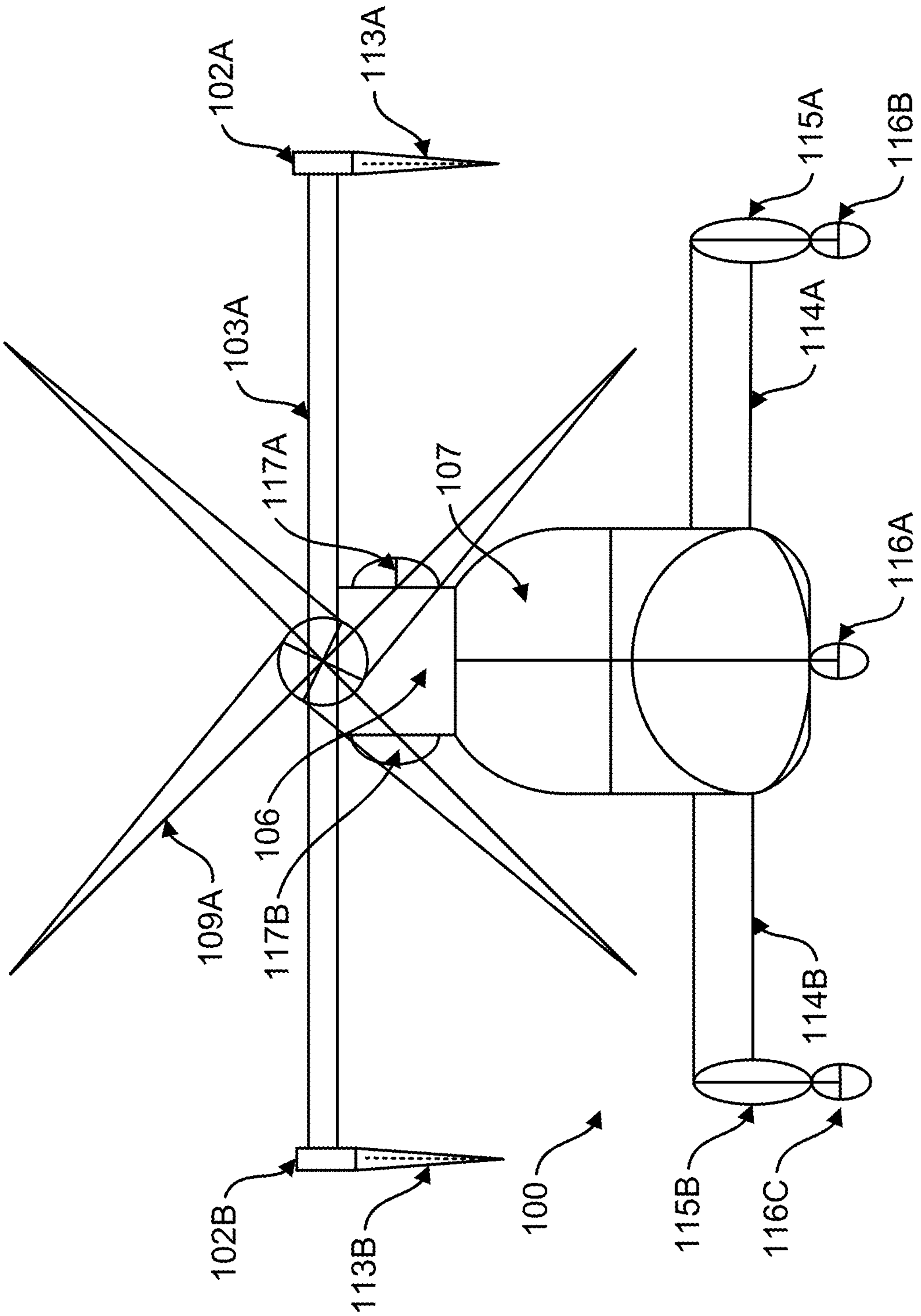
FIG. 3*b* illustrates a frontal view of a VTOL aircraft in its horizontal flight configuration in accordance with some implementations of the present disclosure.

FIG. 1*a*, FIG. 2*a* and FIG. 3*a* illustrate the VTOL aircraft 200 in VTOL mode, the linear support 102, rotor-fixing support 103, main wing 104, tiltrotor system 105 and wing platform complex 106 comprise a platform. The horizontal planes of the linear support 102, the rotor-fixing support 103 and the main wing 104 are within the same plane, referred to as the flight platform plane. The axes of the front tiltrotor 105A and rear tiltrotor 105B and the connecting line between the two tiltrotors are within the same vertical plane, which is vertical to the flight platform plane. The left linear support 102A and right linear support 102B and the longitudinal axes of the rotor-fixing support 103 and main wing 104 are symmetrical to the connecting line between the front tiltrotor 105A and rear tiltrotor 105B.

In some embodiments of the present disclosure, the wing platform complex 106 is disposed beneath the frame 10 and configured to accommodate a power system 15 and connect the frame 10 to a vehicle. The power system 15 is configured to provide power for the front tiltrotor 105A and the rear tiltrotor 105B. In some embodiments, the power system 15 may be configured to provide power for the whole VTOL aircraft. In some embodiments, the power system 15 is powered by any one or any combination of the following power resources: fuel, electricity, solar power, wind power, and nuclear power.

In some embodiments of the present disclosure, as illustrated in FIG. 2*a*, FIG. 2*b*, FIG. 3*a*, and FIG. 3*b*, a wing platform complex 106 is positioned beneath the central section of the main wing 104. A power system includes an electric generator 118 and a gas engine 117 that drives the electric generator 118 are positioned at the rear part of the wing platform complex 106, and the gas engine 117 includes a left engine 117A and a right engine 117B, disposed on two sides divided by a central line of the frame 10. In another embodiment, the power system may be positioned at the rear part of the fuselage 107 accordingly. A gearbox 121 is positioned in the front part of the wing platform complex 106.

Referring to FIG. 1*a*, FIG. 2*a* and FIG. 3*a*, the VTOL aircraft 200 comprises a fuselage 107 situated beneath the wing platform complex 106. The longitudinal axis of the fuselage 107 and the connecting line between the front tiltrotor 105A and rear tiltrotor 105B are parallel and within the same vertical plane relative to the flight platform plane.

Figure 1B:
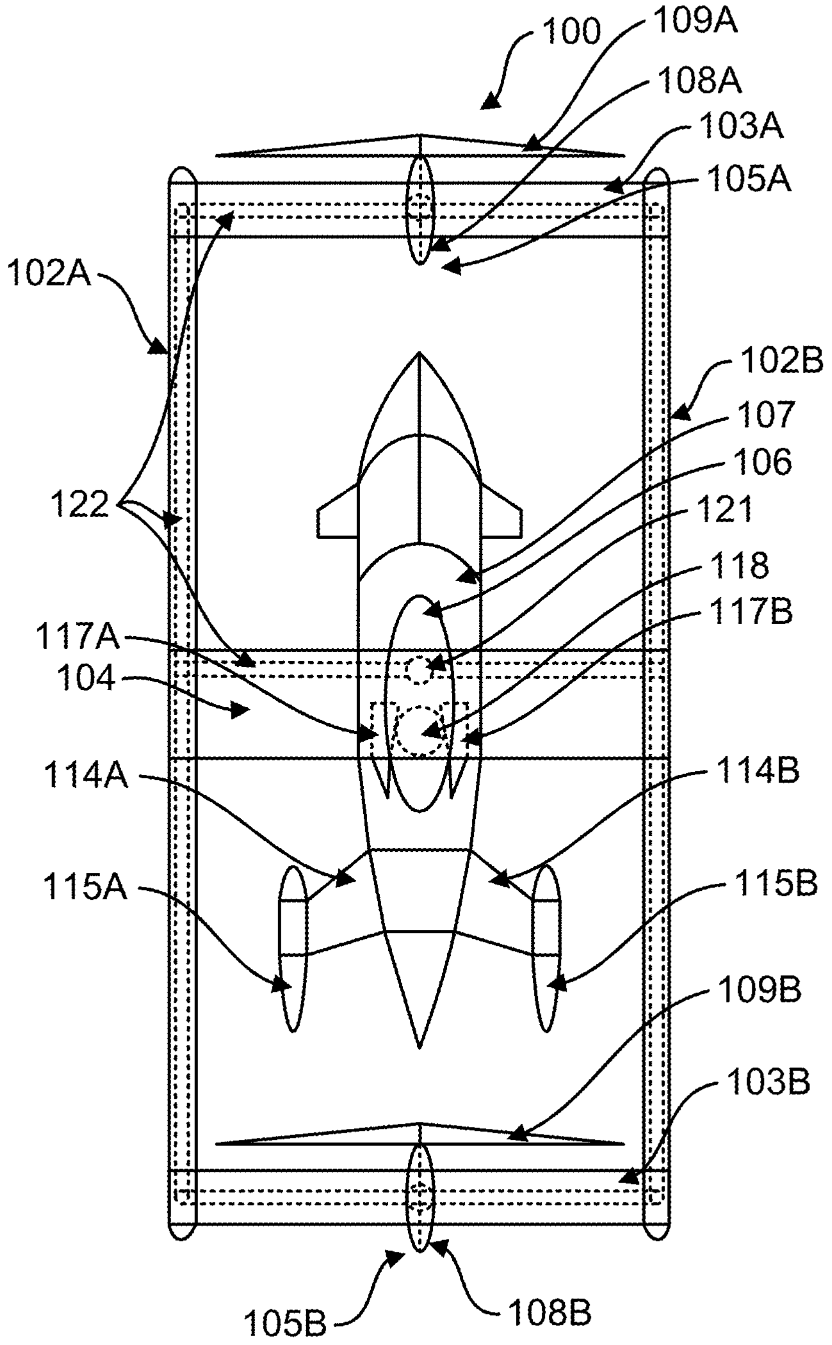
FIG. 1*b* illustrates an overhead perspective of a VTOL aircraft in its horizontal flight configuration in accordance with some implementations of the present disclosure.

Referring to FIG. 1*b*, FIG. 2*a* and FIG. 3*a*, the tiltrotor system 105 configuration includes a rotor 108, a propeller 109, and related gears and nacelle. The front tiltrotor 105A and rear tiltrotor 105B have identical rotation speeds but opposite rotation directions. This specific arrangement plays a crucial role in maintaining balance and stability for the VTOL aircraft 200. If one of the tiltrotors 105A and 105B becomes inoperative, the other one remains functional and may assist the VTOL aircraft 200 in safe flight or emergency landing. Should both tiltrotors 105A and 105B malfunction, an emergency parachute stored in the main wing 104 may be used to ensure the VTOL aircraft 200's safe emergency landing. In some embodiments, the speed of the front tiltrotor 105A or rear tiltrotor 105B may be adjusted in real-time to meet specific flying requirements, such as keeping the aircraft's balance while changing the flying direction.

Figure 2B:
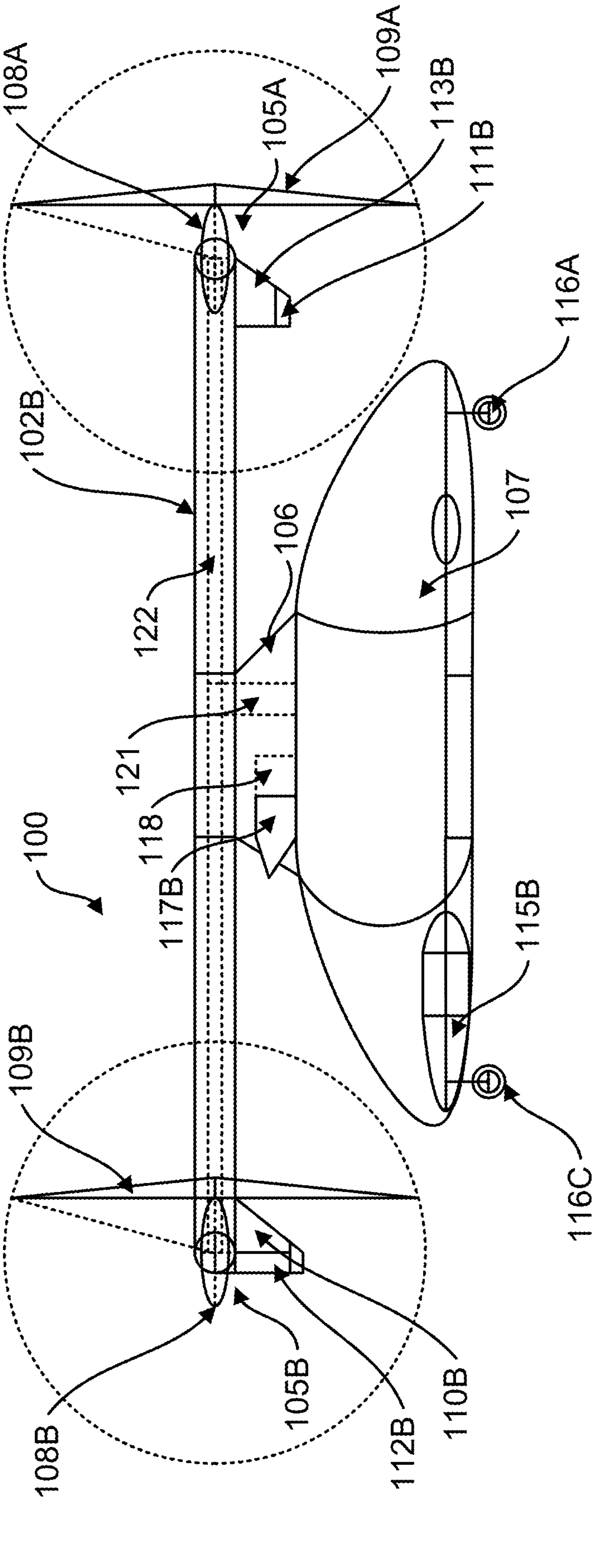
FIG. 2*b* illustrates a lateral view of a VTOL aircraft in its horizontal flight configuration in accordance with some implementations of the present disclosure.

As illustrated in FIG. 2*a* and FIG. 2*b*, a rear stabilizer 110, consisting of both a left rear stabilizer 110A and a right rear stabilizer 110B, is positioned downward the rear ends of the left linear support 102A and right linear support 102B. The rear stabilizer 110 comprises a vertically rotatable rudder 112 capable of rotating along a vertical axis to control the directions of the VTOL aircraft 200 during horizontal flight.

Continuing to refer to FIG. 2*a* and FIG. 2*b*, a front stabilizer 113 consists of a left front stabilizer 113A and a right stabilizer 113B beneath the front part of the linear supports 102A and 102B used to help the VTOL aircraft 200 in balance. The front stabilizer 113 comprises a horizontally rotatable rudder 111 capable of rotating along a horizontal axis to control the directions of the VTOL aircraft 200 during VTOL operations. In some embodiments, the VTOL aircraft 200 may not include the front stabilizer 113.

Referring to FIG. 1*a* and FIG. 2*a*, in some embodiments, the wing platform complex 106 is further configured to accommodate a transmission mechanism 16 configured to provide transmission between the power system 15 and the front tiltrotor 105A or the rear tiltrotor 105B, and the power system 15 and the transmission mechanism 16 are disposed on opposite sides of the wing platform complex 106. The transmission mechanism 16 includes a combined gearbox 121 and a transmission shaft system 122, positioned in the wing platform complex 106, main wing 104, linear supports 102 and rotor-fixing support 103, accordingly. The transmission mechanism 16 is connected to the operation system, tiltrotor and/or power system, which is used to control the flight status of the VTOL aircraft 200 or transmit the power to tiltrotor 105.

The fuselage 107 includes a tail wing 114 designed to aid in maintaining balance and installing rear wheels. And the tail wing 114 arranged on the rear part of the fuselage 107 comprises a left tail wing 114A and a right tail wing 114B.

The fuselage 107 incorporates a retractable wheel system which includes a wheel cabin 115 and a retractable wheel 116. The wheel cabin consists of a left rear wheel cabin 115A beneath the far end of the left rear tail wing 114A and a right rear wheel cabin 115B beneath the far end of the right rear tail wing 114B. The retractable wheel 116 consists of a front retractable wheel 116A beneath the prow of the fuselage 107, a left rear retractable wheel 116B beneath the left rear wheel cabin 115A, and a right rear retractable wheel 116C beneath the right wheel cabin 115B. During horizontal flight mode, the retractable wheels may be stowed within the fuselage or wheel cabins, respectively. Alternatively, the rear retractable wheels 116B and 116C also may be stowed in the tail wings 114A and 114B, respectively. In some embodiments, a foldable wheel system may be included in the tail wings 114A and 114B to stow the rear retractable wheels 116B and 116C, respectively.

Continuing to refer to FIG. 1*a* and FIG. 2*a*, it is worth noting that the gravity center of the VTOL aircraft 200 is positioned beneath the flying apparatus 100. Notably, the distances from this gravity center to the front tiltrotor 105A and rear tiltrotor 105B are equal, as are the distances to the connecting points of the linear supports 102A and 102B, and the rotor-fixing supports 105A and 105B. The presence of a low gravity center further facilitates stability during horizontal flight.

As shown in FIG. 1*a* and FIG. 2*a*, the VTOL aircraft 200 employs hybrid power. The tiltrotor's rotors 108A and 108B may be powered by electric motors. An electric generator 118 coupled an engine 117, which includes a left engine 117A and a right engine 117B are positioned at the rear section of the wing platform complex 106. This design ensures redundancy, if one engine malfunctions, the other remains operational to assist the VTOL aircraft 200 in safe flight or landing safely. In the rare event that both engines 117A and 117B or the generator 118 fail, an emergency parachute stored in the main wing 104 or the rechargeable batteries positioned in the VTOL aircraft will ensure the VTOL aircraft 200 to execute a safe emergency landing procedure.

In another embodiment, the power system includes an electric generator 118 and a gas engine 117 may be positioned at the rear section of the fuselage 107. The left engine 117A and right engine 117B may also be positioned within the left rear wheel cabin 115A and right rear wheel cabin 115B to reduce the noise and vibration, respectively.

In an embodiment of the present disclosure, the tiltrotor 105 may receive direct power from a gas engine. This may be achieved through a power system featuring one or two engines located within the wing platform complex 106 or other parts of the VTOL aircraft 200, which are responsible for propelling the rotor 108 of the tiltrotor 105 via the transmission mechanism 16. Alternatively, the rotor 108 of the tiltrotor 105 may be directly driven by a gas engine.

In some embodiments of the present disclosure, the tiltrotor 105's rotor 108 may be electrically powered by rechargeable battery groups within the VTOL aircraft 200.

FIG. 1*a*, FIG. 1*b*, FIG. 2*a* and FIG. 2*b* illustrate that the rotor-fixing support 103 is fixed on the linear support 102 horizontally. The tiltrotor 105 of the VTOL aircraft 200 may be tilted forward, upward, or backward suitably in unison along the longitudinal axis of the rotor-fixed support 103 according to a transmission system. In VTOL mode, the VTOL aircraft 200 may achieve vertical takeoff and landing by tilting the tiltrotor 105 upward, and turn left or right by operating the status of horizontally rotatable rudder 111 of the stabilizer 113. The VTOL aircraft 200 may fly forward horizontally by tilting the tiltrotor 105 forward in horizontal flight mode, and turn left or right by operating the status of vertically rotatable rudder 112 of the stabilizer 110. In some embodiments, the speed and the tilting status of the front tiltrotor 105A or rear tiltrotor 105B may also be adjusted in real-time to meet specific flying requirements, such as keeping the aircraft's balance while changing the flying direction.

In another embodiment, the rotor 108 of the tiltrotor 105 is fixed on the rotor-fixing support 103, and only the axis of the propeller 109 is tilted along the longitudinal axes of the rotor-fixing support 103 according to a pylon system during the transition of flight status. In some other embodiments, the propeller 109 is fixed on the rotor 108 and the rotor 108 is fixed on the rotor-fixing support 103, and the propeller 109 and the rotor 108 are tilted together with the rotation of the rotor-fixing support 103 during the transition of flight status.

Figure 4A:
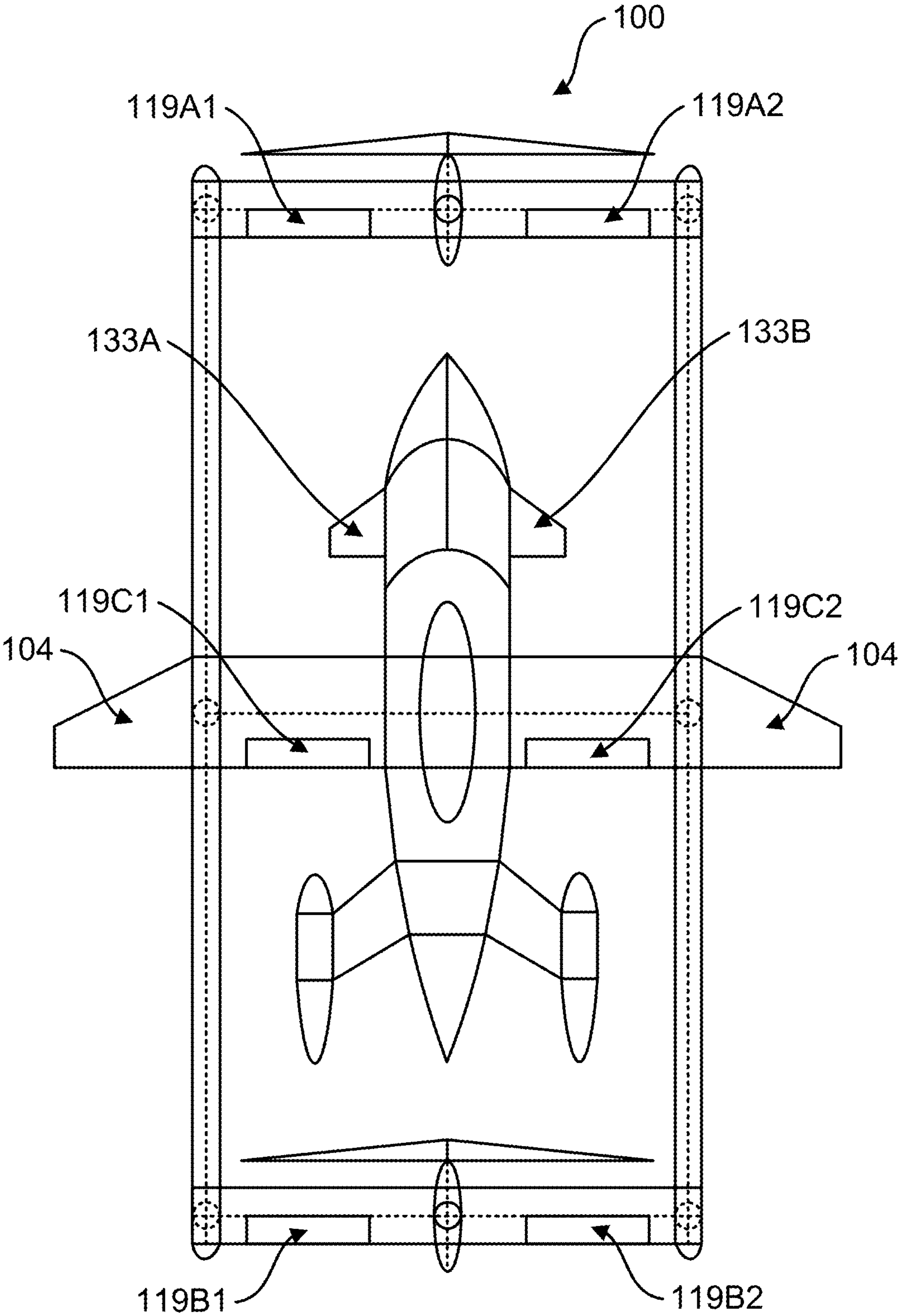
FIG. 4*a* illustrates an overhead view of a VTOL aircraft with extended main wing in its horizontal flight configuration in accordance with some implementations of the present disclosure.

As shown in FIG. 1*a* and FIG. 1*b*, the rotor-fixing support 103 and main wing 104 produce the primary lift during horizontal flight. Additionally, as shown in FIG. 4*a*, flaps 119A, 119B and/or 119C may be placed on both the rotor-fixing support 103 and the main wing 104. The front rotor-fixing support 103A may include a front flap 119A1/A2, configured to rotate to provide a front lift force, the rear rotor-fixing support 103B may include a rear flap 119B1/B2, configured to rotate to provide a rear lift force, and the main wing 104 may include a middle flap 19C1/C2, configured to rotate to provide a middle lift force.

Figure 4B:
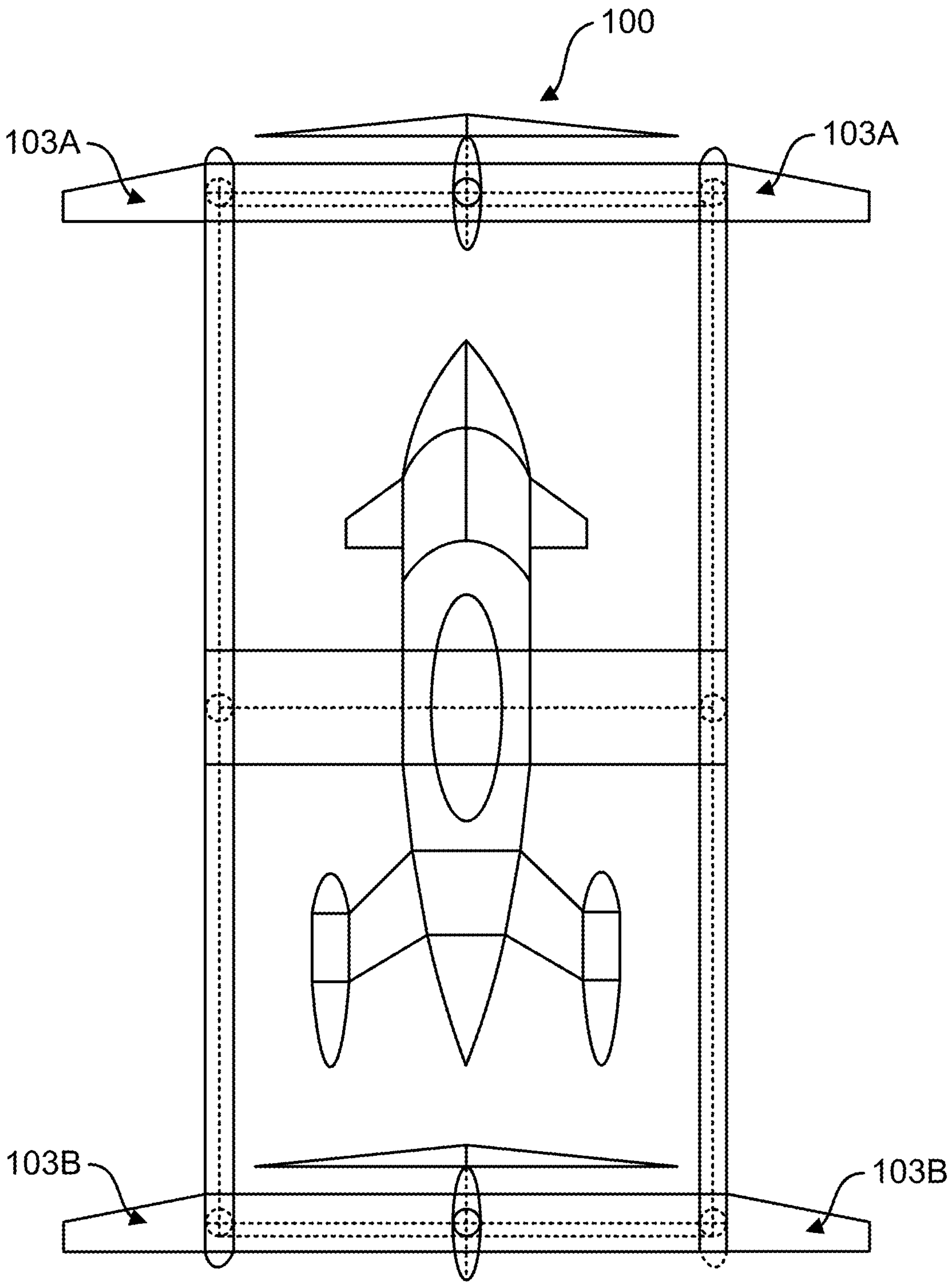
FIG. 4*b* illustrates an overhead view of a VTOL aircraft with extended rotor-fixing support in its horizontal flight configuration in accordance with some implementations of the present disclosure in accordance with some implementations of the present disclosure.

As illustrated in FIGS. 4*a* and 4*b*, the rotor-fixing support 103 or main wing 104 may be symmetrically extended to a greater length to offer more lift in horizontal flight mode, when necessary.

Figure 5A:
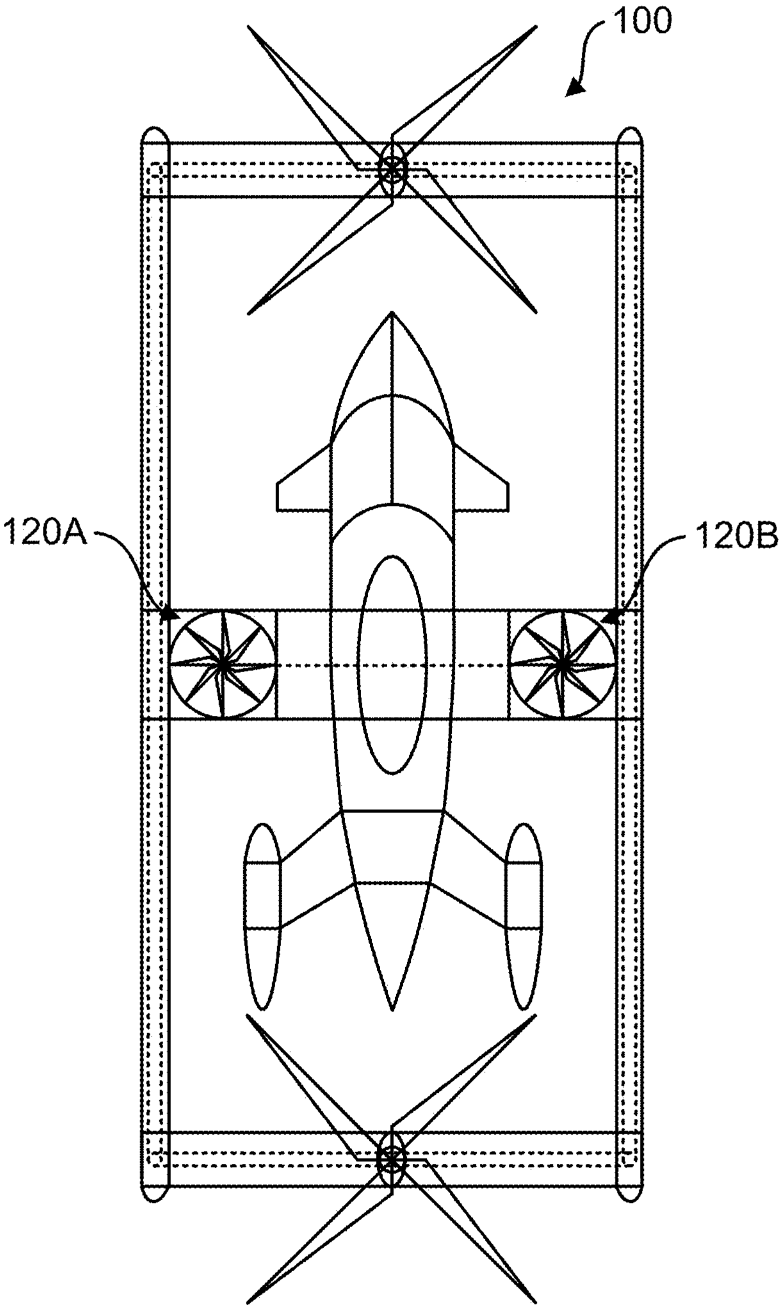
FIG. 5*a* illustrates an overhead view of a VTOL aircraft with an assistant VTOL system in its VTOL configuration in accordance with some implementations of the present disclosure.
Figure 5B:
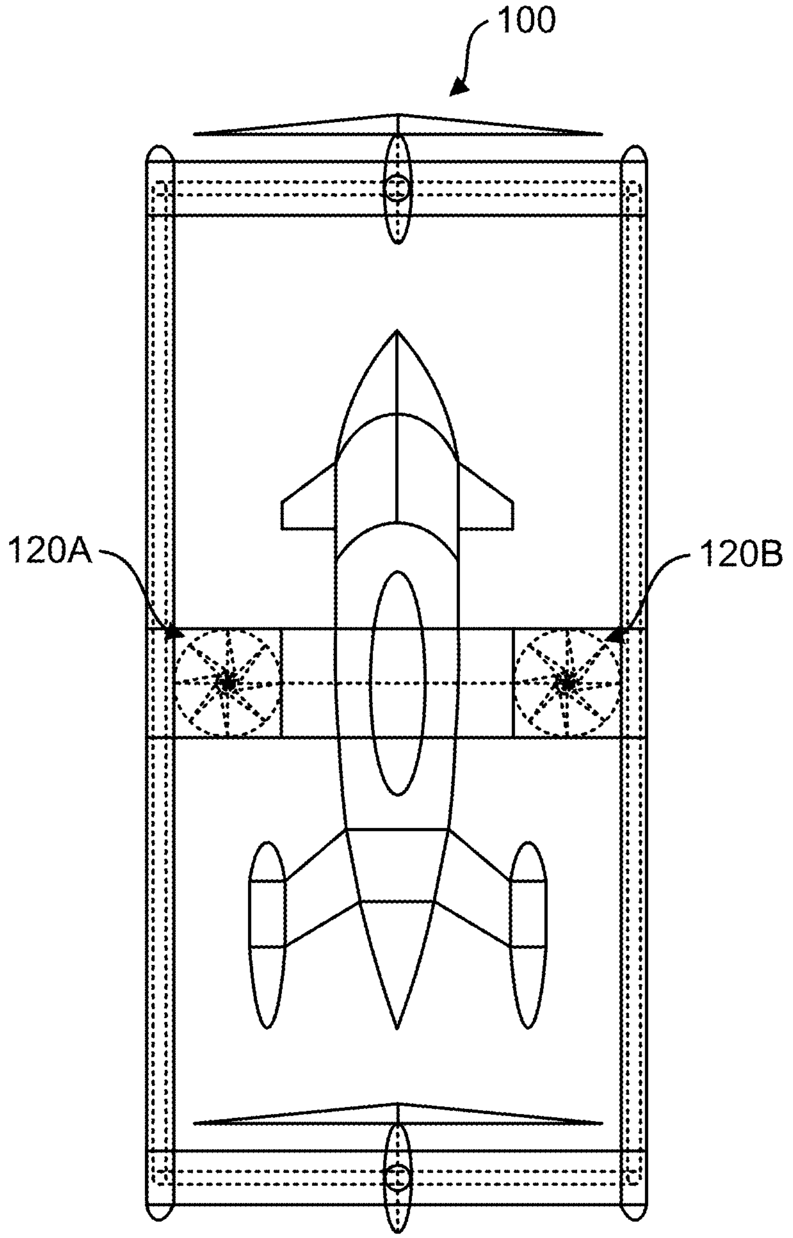
FIG. 5*b* illustrates an overhead view of a VTOL aircraft with an assistant VTOL system in its horizontal flight configuration in accordance with some implementations of the present disclosure.

As illustrated in FIG. 5*a*, an assistant VTOL system 120 is used to help the VTOL aircraft to realize VTOL in VTOL mode, when necessary, and control the balance of the aircraft 200. The assistant system includes a left lift fan 120A, a right lift fan 120B, configured to assist a vertical flight of the flying apparatus 100 or the VTOL aircraft 200, and related covers, and positioned on both sides of the main wing 104 in symmetry, respectively. As illustrated in FIG. 5*b*, the assistant VTOL system is closed when the flying apparatus 100 or the VTOL aircraft 200 in horizontal flight mode.

Figure 6A:
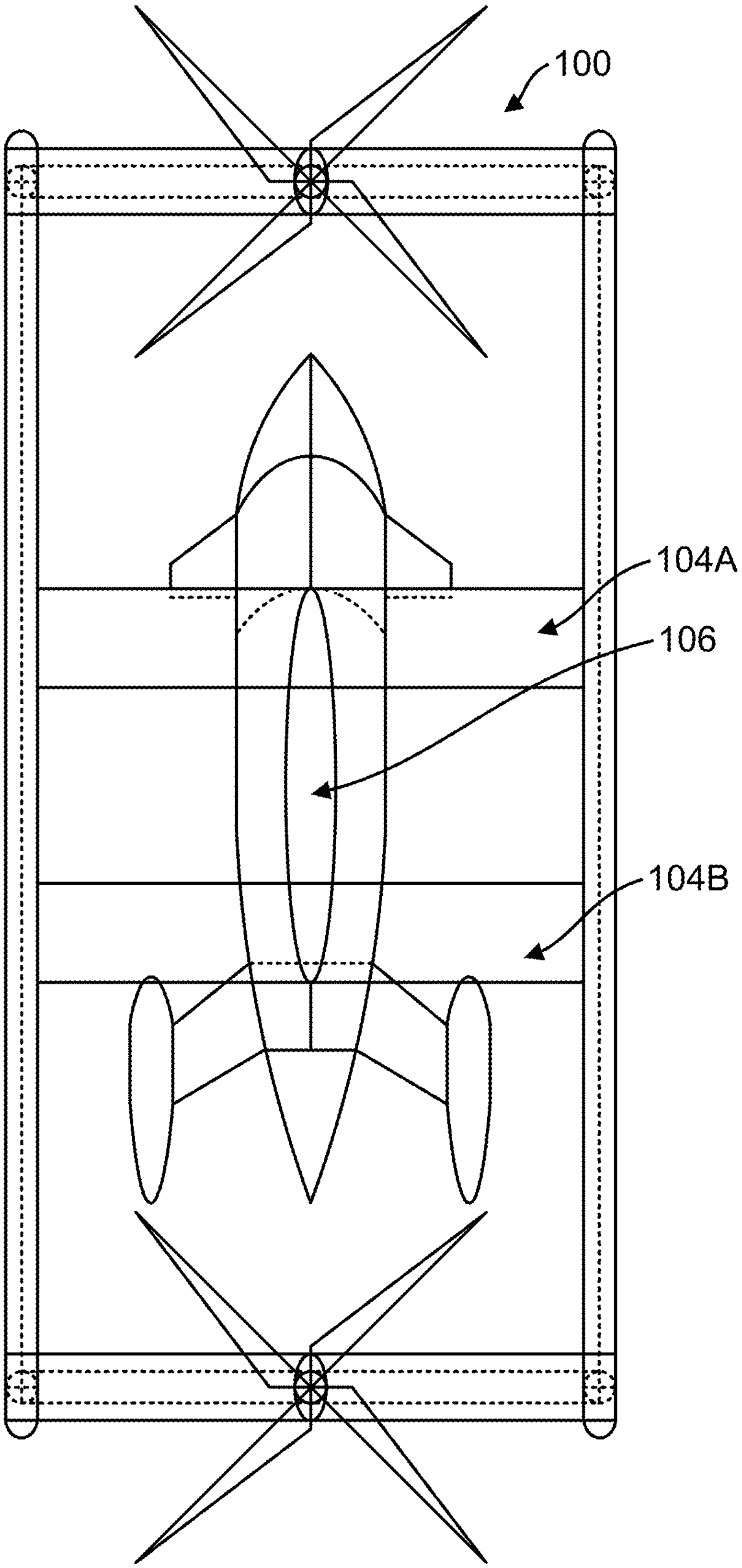
FIG. 6*a* illustrates an overhead view of a VTOL aircraft with two main wings in its VTOL configuration in accordance with some implementations of the present disclosure.
Figure 6B:
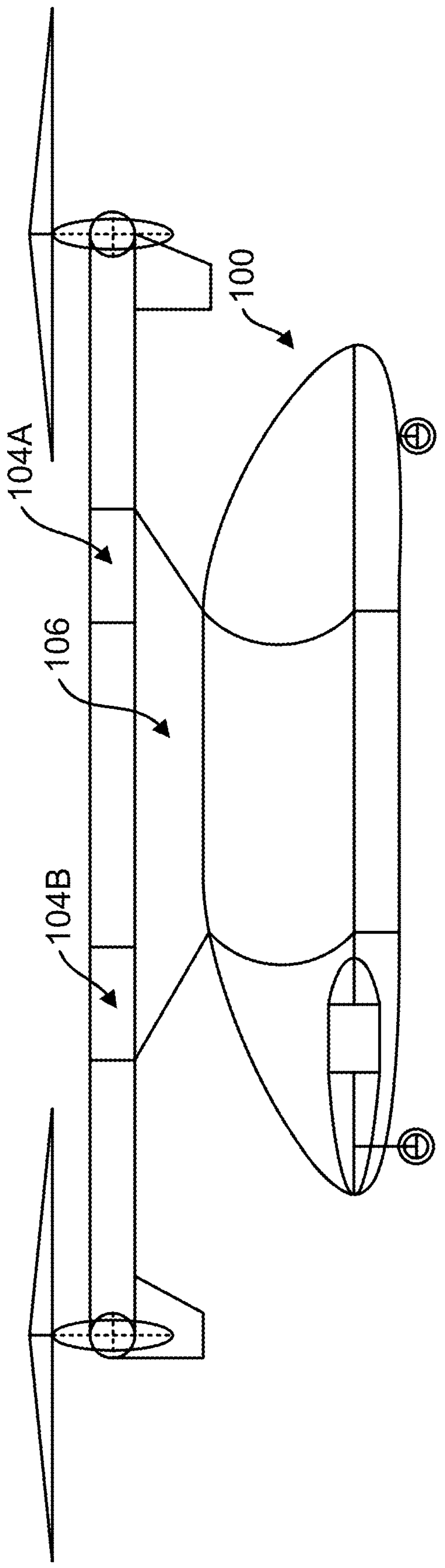
FIG. 6*b* illustrates a lateral view of a VTOL aircraft with two main wings in its VTOL configuration in accordance with some implementations of the present disclosure.

As illustrated in FIGS. 6*a* and 6*b*, in an alternative embodiment, the main wing 104 may be configured with a front main wing 104A and a rear main wing 104B, depending on the requirements.

Figure 7A:
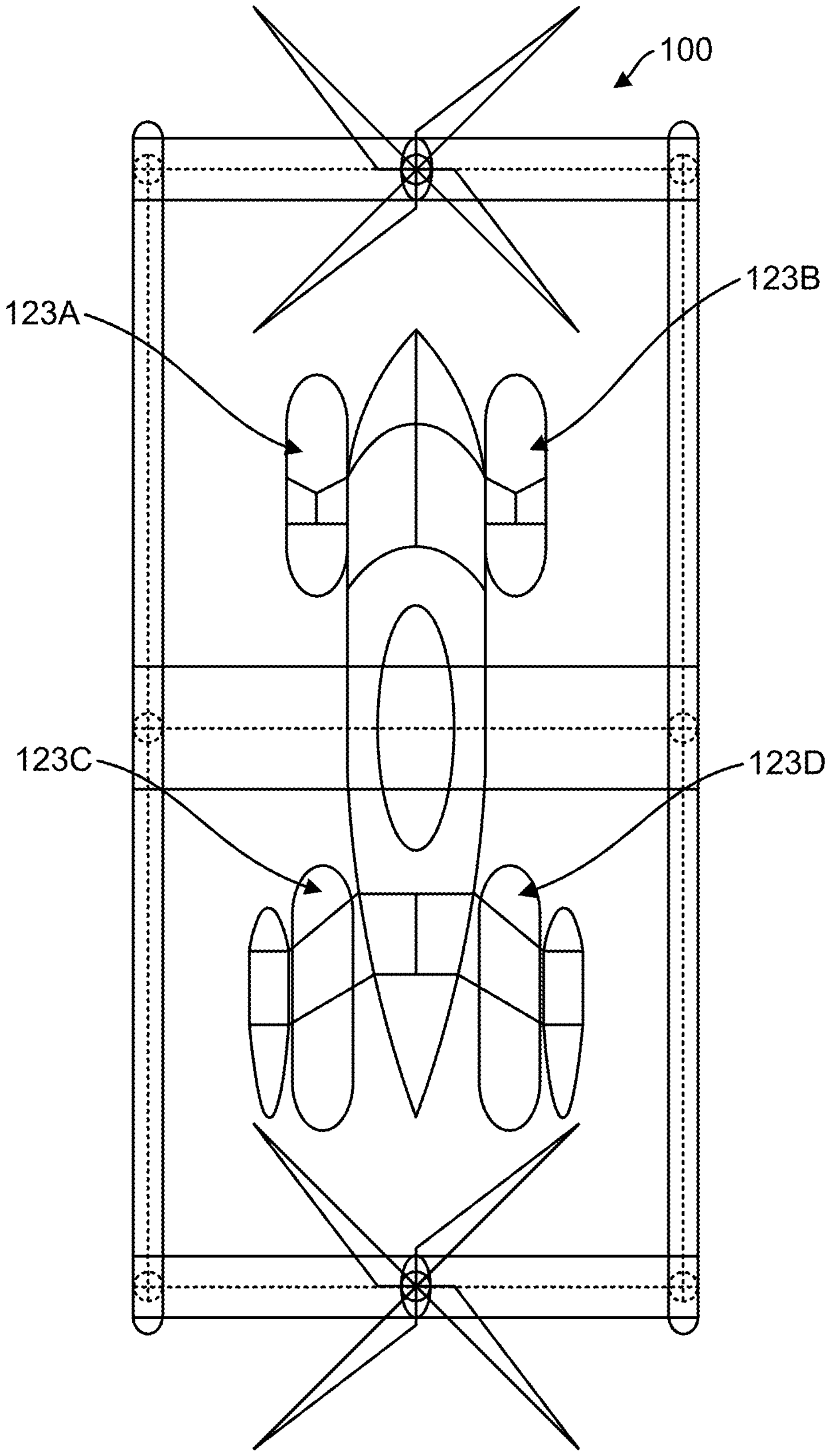
FIG. 7*a* illustrates an overhead view of a VTOL aircraft with inflatable float system in its VTOL configuration in accordance with some implementations of the present disclosure.

As illustrated in FIG. 7*a*, another variation involves employing an inflatable float system 123 for water landings, comprising left front inflatable float 123A, right front inflatable float 123B, left rear inflatable float 123C, and right rear inflatable float 123D, which are compressed in both sides of the front and rear parts of the fuselage 107. In some embodiments, an additional inflatable float may be hidden in the fuselage. In some embodiments, two floats may be positioned on both sides of the fuselage in symmetry. However, the number and the position arrangement of the floats are not limited to the embodiments of the present disclosure.

Figure 7B:
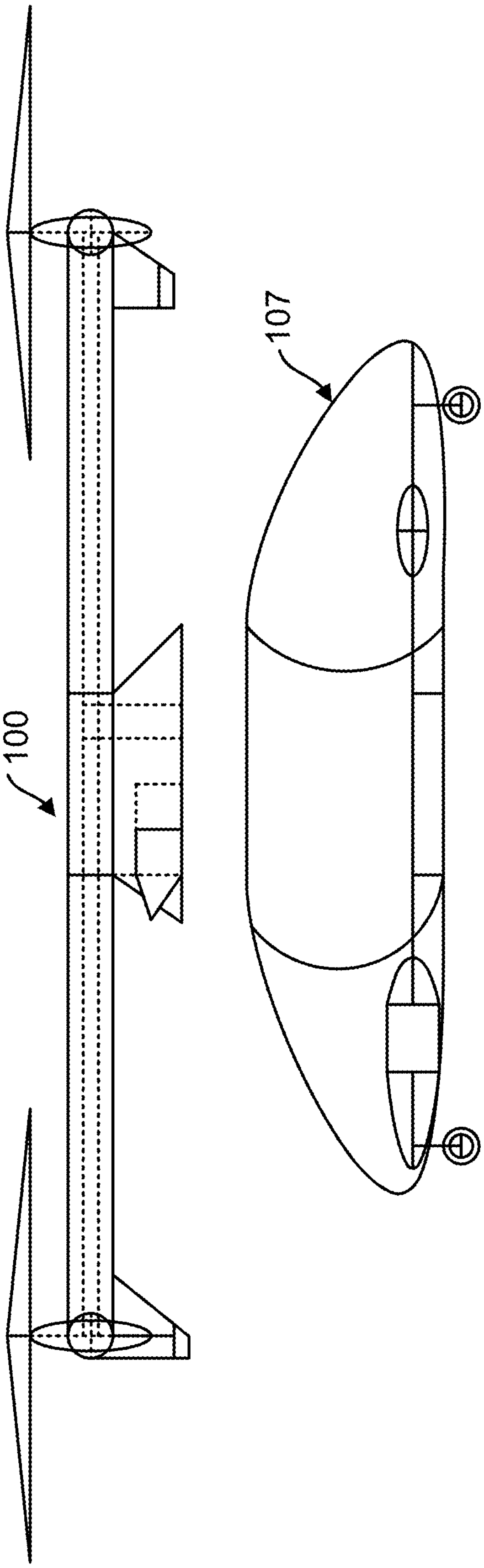
FIG. 7*b* illustrates a lateral view of a VTOL aircraft with the flying apparatus separated from fuselage in accordance with some implementations of the present disclosure.
Figure 8A:
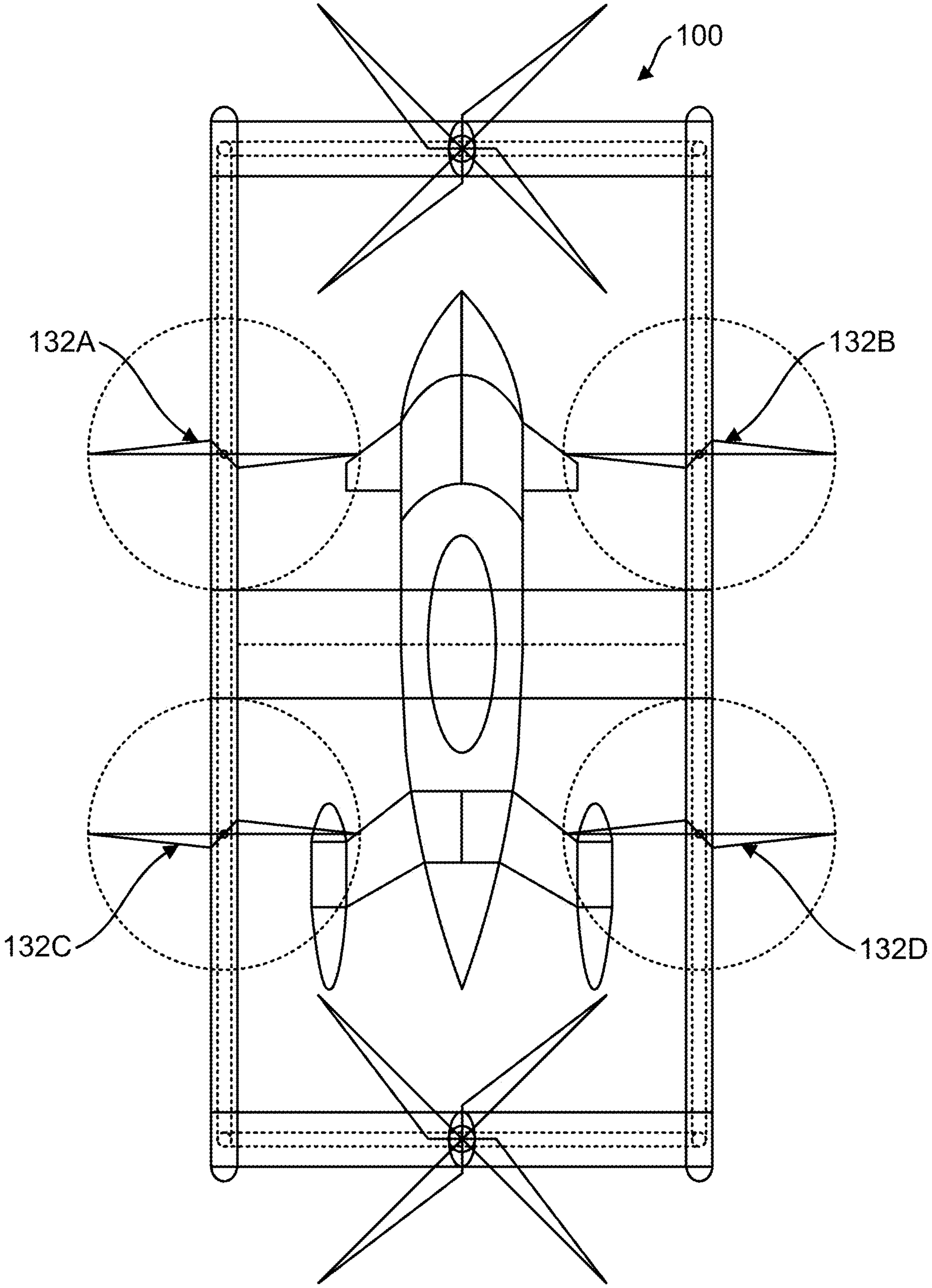
FIG. 8*a* illustrates an overhead perspective of a VTOL aircraft with an assistant VTOL system in its VTOL configuration in accordance with some implementations of the present disclosure.
Figure 8B:
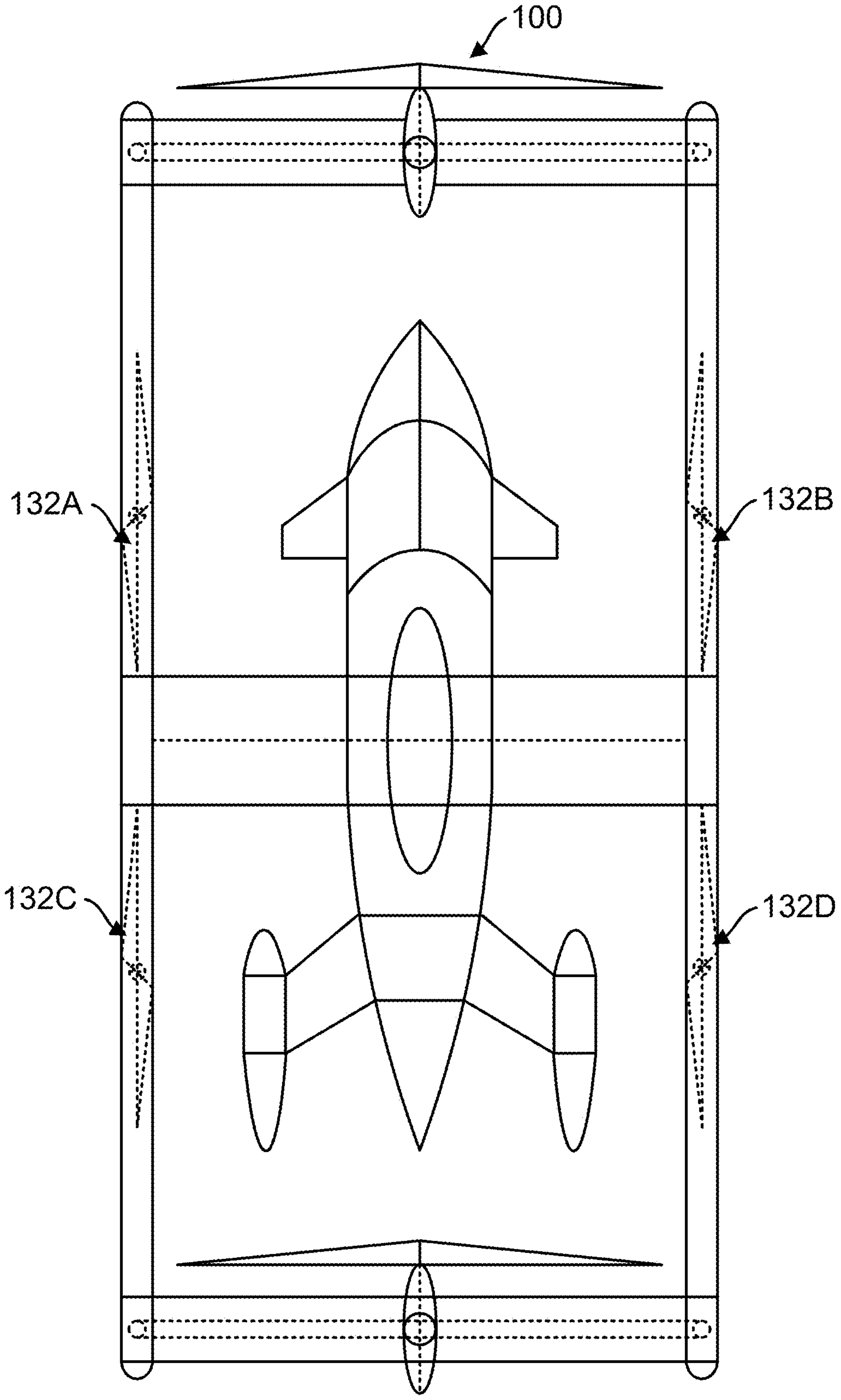
FIG. 8*b* illustrates an overhead perspective of a VTOL aircraft with an assistant VTOL system in its horizontal flight configuration in accordance with some implementations of the present disclosure.
Figure 9A:
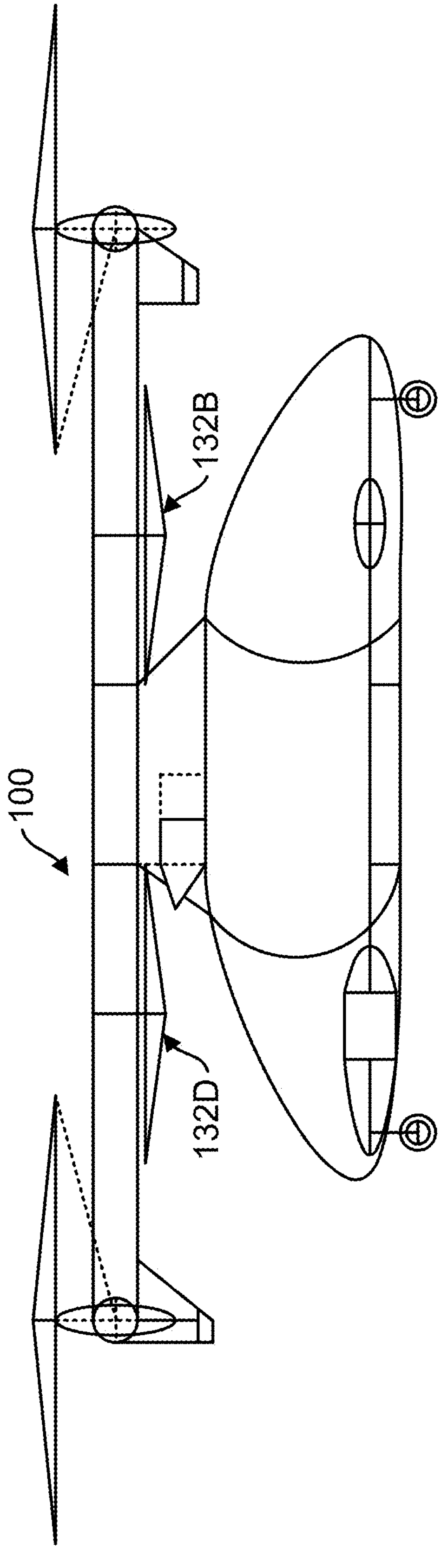
FIG. 9*a* illustrates a lateral view of a VTOL aircraft with an assistant VTOL system in its VTOL configuration in accordance with some implementations of the present disclosure.
Figure 9B:
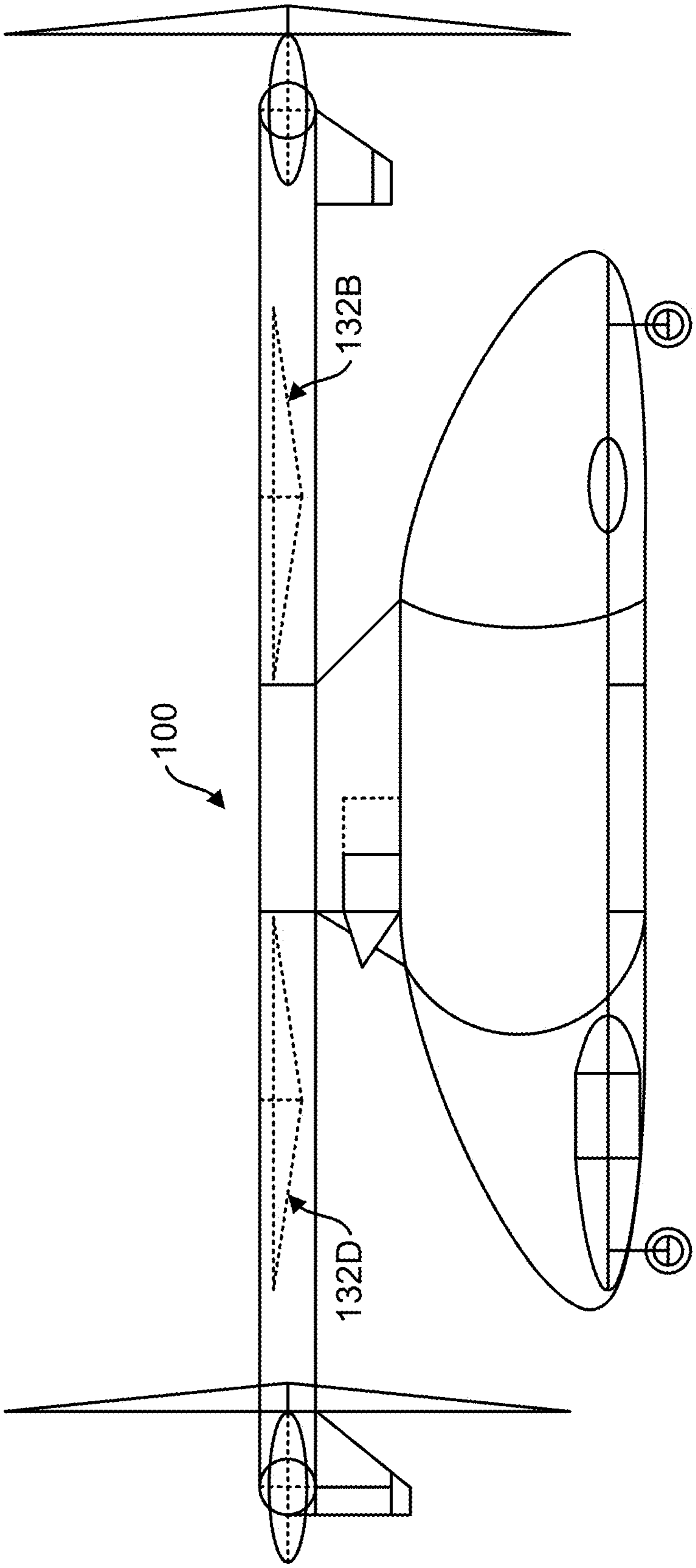
FIG. 9*b* illustrates a lateral view of a VTOL aircraft with an assistant VTOL system in its horizontal flight configuration in accordance with some implementations of the present disclosure.

FIG. 7*b* illustrates a lateral view of a VTOL aircraft with the VTOL flying apparatus separated from fuselage 107 in accordance with some implementations of the present disclosure. In some embodiments, the flying apparatus 100 may fly separately from the fuselage 107, so that the flying apparatus 100 may fly independently to carry another vehicle, and the fuselage 107 may move to another location. In some embodiments, the fuselage 107 may be a drivable vehicle or a remotely controllable vehicle. By such a modular design, the connection of the flying apparatus 100 and the fuselage 107 may be detachable to meet flexible requirements of some specific application scenarios with multiple destinations.

In some embodiments of the present disclosure, as illustrated in FIG. 1*a*, FIG. 2*a* and FIG. 2*b*, the propeller 109's diameter of the tiltrotor 105 is appropriately shorter than the length of the rotor-fixing support 103. Thus, a diameter of a front propeller 109A of the front tiltrotor 105A is less than a length of the front rotor-fixing support 103A, or a diameter of a rear propeller 109B of the rear tiltrotor 105B is less than a length of the rear rotor-fixing support 103B. Additionally, the distances between the tiltrotor 105 and the main wing 104, as well as the height of the wing platform complex 106, have been adjusted to ensure that the rear propeller 109B of the rear tiltrotor 105B does not come into contact with the fuselage 107 when transitioning from the VTOL state to the horizontal flight state.

In some other embodiments, the rear tiltrotor 105B would be configured to tilt backwards so that the rear propeller

109B of the rear tiltrotor 105B does not interfere with the linear support 102A/102B, and the diameter of the rear propeller 109B is unnecessary to be less than the length of the rear rotor-fixing support 103B, thus the diameter of the propeller 109B will not be limited by the length of the rotor-fixing support 103B.

In some embodiments of the present disclosure, as illustrated in FIG. 8*a*, FIG. 8*b*, FIG. 9*a* and FIG. 9*b*, the linear support 102A/102B may include a retractable propeller 132A, 132B, 132C, and 132D, configured to assist a vertical flight and balance control of the flying apparatus and retract into the linear support during a horizontal flight of the flying apparatus. These retractable propellers 132A, 132B, 132C and 132D are used for assisting vertical takeoff and landing without impacting the efficiency of the flying apparatus 100 or the VTOL aircraft 200. When the flying apparatus 100 or the VTOL aircraft 200 changes to the status of flying forward, the retractable propeller 132A, 132B, 132C, and 132D may retract into the linear support 102A/102B so that the flying efficiency and speed will not be influenced.

In some embodiments of the present disclosure, the wing platform complex 106 is configured to retract into the frame 10 during a horizontal flight of the flying apparatus, so that the size of the flying apparatus 100 or the VTOL aircraft 200 may be reduced during the horizontal flight. The wing platform complex 106 is also configured to extend out from the frame 10 during a vertical flight of the flying apparatus, so that the gravity core may be lowered to enhance the stability of the aircraft, and the inflicting of propellers with the fuselage 107 during transition may be avoided.

The pilot in the steering room has the capability to manage the VTOL aircraft 200's status according to the operation system and transmission system. Alternatively, a computerized procedure may be utilized to govern the VTOL aircraft 200's status to control the transmission system automatically.

In some embodiments of the present disclosure, the flying apparatus 100 or the VTOL aircraft 200 may be equipped with a computational system featuring one or more processors responsible for ensuring the optimal functioning of the power and control systems and maintaining the balance of the flying apparatus 100 or the VTOL aircraft 200 throughout both flight and flight state transitions. The one or more processors may execute instructions to perform all or some of the steps in the above-described methods. The instructions may be stored in a non-transitory computer-readable storage medium coupled to the one or more processors. Moreover, the one or more processors may include one or more modules that facilitate the interaction between the processor and other components. The processor may be a Central Processing Unit (CPU), a microprocessor, a single chip machine, a Graphical Processing Unit (GPU), or the like.

Figure 10:
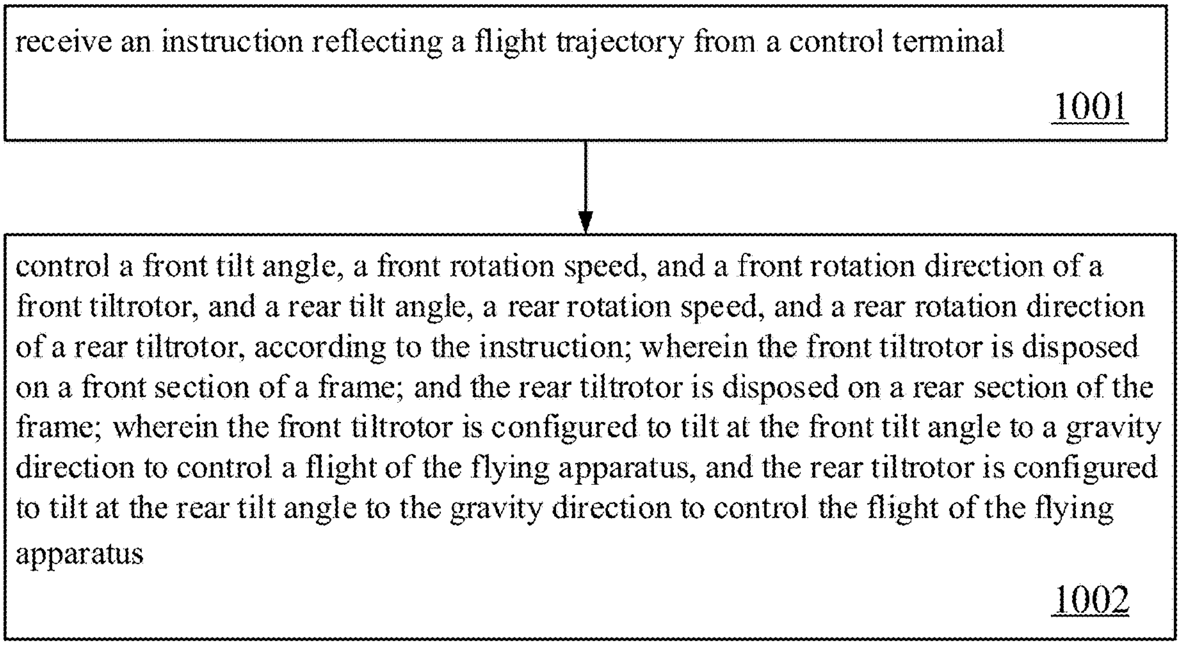
FIG. 10 is a block diagram that illustrates a method for controlling the flight of a flying apparatus in accordance with some implementations of the present disclosure.

FIG. 10 is a block diagram that illustrates a method for controlling the flight of a flying apparatus in accordance with some implementations of the present disclosure. The method may be executed by one or more processors. In Step 1001, the one or more processors receive an instruction reflecting a flight trajectory from a control terminal. In Step 1002, the one or more processors control a front tilt angle, a front rotation speed, and a front rotation direction of a front tiltrotor, and a rear tilt angle, a rear rotation speed, and a rear rotation direction of a rear tiltrotor, according to the instruction; wherein the front tiltrotor is disposed on a front section of a frame; and the rear tiltrotor is disposed on a rear section of the frame; wherein the front tiltrotor is configured to tilt at the front tilt angle to a gravity direction to control a flight of the flying apparatus, and the rear tiltrotor is configured to tilt at the rear tilt angle to the gravity direction to control the flight of the flying apparatus.

Some embodiments of the present disclosure are directed to a VTOL aircraft featuring tandemly arranged tiltrotors, which may address the existing issues of low efficiency, reliability, and safety.

The Disclosure outlines the inclusion of a fixed wing tandem tiltrotors VTOL aircraft, including: A tiltrotor system arranged on the front and rear part of the VTOL aircraft in tandem manner and providing forward thrust and upward lift to realize horizontal flight and vertical takeoff and landing, respectively.

In an embodiment of the disclosure, the tiltrotor VTOL aircraft further includes a linear support, a rotor-fixing support, a main wing, a wing platform complex, and a fuselage. The linear support includes a left linear support and a right linear support, which are arranged in parallel and symmetry and serve the purpose of fixing the rotor-fixing support and main wing. The rotor-fixing support includes a front rotor-fixing support and a rear rotor-fixing support, which are connected to the front and rear ends of the left and right linear supports respectively. The main wing has the same length as the rotor-fixing support and is connected to the middle section of the left and right linear supports. The tiltrotor system consists of a front tiltrotor and a rear tiltrotor, and related gears and nacelles. The front and rear tiltrotors are positioned on the middle section of the front and rear rotor-fixing supports in tandem configuration, respectively. The linear support, rotor-fixing support, main wing, tiltrotor, and wing platform complex together form a platform, referred to as the flight platform. The horizontal planes of the linear support, rotor-fixing support and main wing within the same plane, are referred to as the flight platform plane.

In an embodiment of the disclosure, a fuselage may be coupled to the middle section of the main wing according to the connection of a wing platform complex. The wing platform complex also may serve as an equipment cabin for housing essential components such as the gearboxes, transmission shafts, and power system. The left and right linear supports are symmetrical to the longitudinal axes of the wing platform complex and fuselage.

In an embodiment of the disclosure, there is a transmission system that includes transmission shafts and related gears positioned in the rotor-fixing support, linear support, main wing, and even wing platform complex. The transmission system coupled to tiltrotor, power system and operation system, is used for synchronizing the tiltrotors, transmitting the power and controlling the status of the VTOL aircraft.

In an embodiment of the disclosure, a rear stabilizer includes a left and a right rear stabilizer located downward the rear ends of the left and right linear supports, respectively. Each of these stabilizers includes a vertically rotatable rudder to steer the aircraft during horizontal flight. Additionally, a front stabilizer includes a left front stabilizer and a right front stabilizer located downward the front section of the left and right linear supports used to help the VTOL aircraft in balance. Each of the front stabilizer has a horizontally rotatable rudder to control direction during VTOL status. Alternatively, the VTOL aircraft also may change flight directions according to the tiltrotor's speed and status.

In an embodiment of the disclosure, a tail wing, including both a left and a right tail wing, is located at the rear part of the fuselage to aid in maintaining balance. The VTOL aircraft includes a retractable wheel system which includes a front retractable wheel under the prow of the fuselage, a left rear wheel cabin and retractable wheel beneath the far end of the left tail wing and a right rear wheel cabin and retractable wheel beneath the far end of the right tail wing, respectively. Alternatively, the rear retractable wheels also may be stowed within the tail wings, respectively.

In an embodiment of the disclosure, the VTOL aircraft utilizes a hybrid power system and the tiltrotor is electrically powered. In this particular configuration, a power system includes an electric generator and a gas engine that drives the electric generator positioned at the rear part of the wing platform complex or the fuselage. This gas engine setup consists of two engines, a left engine and a right engine, symmetrically placed. This arrangement ensures that if one engine were to malfunction, the other could safely operate the VTOL aircraft for flight or landing. In case of two engines do not working, the rechargeable battery groups stored in the VTOL aircraft or an emergency parachute will help to have an emergency landing. An advanced computerized electrical control system is employed to manage the power distribution, ensuring that the electric motors driving the tiltrotors receive an equitable and consistent supply of electrical power.

In an alternative configuration described in the Disclosure, the tiltrotor may receive its power directly from the gas engine system. A power system located within the wing platform complex, main wing or linear support may engage the tiltrotor through a transmission system. Alternatively, the tiltrotor's motor may be a gas engine directly.

In an embodiment of the disclosure, the VTOL aircraft is totally powered by electricity from the rechargeable battery groups within the VTOL aircraft.

In an embodiment of the disclosure, both the main wing and the rotor-fixing support play a pivotal role in generating the primary lift while the aircraft is in horizontal flight mode. Additionally, flaps may be strategically positioned in both the rotor-fixing support and the main wing as necessary. In an alternative variation of the disclosed concept, the extremities of either the main wing or the rotor-fixing support may be symmetrically extended as required.

In an embodiment of the disclosure, an assistant VTOL system is positioned on both sides of the main wing, when necessary. The assistant VTOL system includes two lift fans positioned on the both sides of the main wing near to linear support in symmetry manner. This VTOL assistant system is used to help the VTOL aircraft to realize VTOL with a relatively short tiltrotor diameter, and closed in horizontal flight mode.

In an embodiment of the disclosure, the VTOL aircraft includes an inflatable float system for emergency water landing. The inflatable float system includes a left front, a right front, a left rear, and a right rear inflatable float bowls compressed in both sides of the front and rear parts of the fuselage.

In an embodiment of the disclosure, the front and rear tiltrotors are rotated at identical speeds but opposite directions. These tiltrotors have the ability to tilt synchronously along the longitudinal axes of the rotor-fixing supports. In VTOL mode, the VTOL aircraft may take off and landing vertically by tilting the tiltrotors upward, and turn left or right by operating the horizontally rotatable rudder of the front stabilizer. The VTOL aircraft may transition into horizontal flight mode by tilting the tiltrotors forward horizontally, and turn left or right by operating the vertically rotatable rudder of the rear stabilizer. Alternatively, the rotor of the tiltrotor is fixed on the rotor-fixing support, and the axis of the propeller is tilted according to a pylon system during the transition of flight status. In case of one tiltrotor does not working, the other one may help to keep flying or landing safely. In case of two tiltrotors do not working, a parachute stored in the main wing will help to have an emergency landing.

In an embodiment of the disclosure, the VTOL aircraft is equipped with a computational system featuring one or more processors responsible for ensuring the optimal functioning of the power and control systems and maintaining the balance of the VTOL aircraft throughout both flight and flight state transitions.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A flying apparatus, comprising:

a tandem tiltrotor system, comprising a front tiltrotor and a rear tiltrotor; and a structural frame, configured to support the tandem tiltrotor system and comprising a front rotor-fixing support, a rear rotor-fixing support, and a linear support configured to connect and fix the front rotor-fixing support and the rear rotor-fixing support;

wherein the front tiltrotor is disposed at a middle portion of the front rotor-fixing support; and the rear tiltrotor is disposed at a middle portion of the rear rotor-fixing support;

wherein the front tiltrotor and the rear tiltrotor are arranged in a tandem manner;

wherein the front tiltrotor is configured to tilt at a front tilt angle to a gravity direction to control a flight of the flying apparatus, and the rear tiltrotor is configured to tilt at a rear tilt angle to the gravity direction to control the flight of the flying apparatus; and wherein, in response to a failure of one of the front tiltrotor or the rear tiltrotor, another one of the front tiltrotor or the rear tiltrotor is configured to maintain controllability of the flying apparatus.

2. The flying apparatus of claim 1, wherein the front tiltrotor includes a front tilting axis that is generally parallel to an upper surface of the front rotor-fixing support, or the rear tiltrotor includes a rear tilting axis that is generally parallel to an upper surface of the rear rotor-fixing support.

3. The flying apparatus of claim 1, wherein at least one of the front tiltrotor and the rear tiltrotor is configured to tilt generally perpendicular to a ground level to drive taking off or landing vertically, or tilt generally parallel to the ground level to drive the flying apparatus take off, fly forward or backward.

4. The flying apparatus of claim 1, further comprising a controller configured to ensure that the front tiltrotor and the rear tiltrotor have identical rotation speeds and opposite rotation directions, or control the front tiltrotor and the rear tiltrotor to tilt synchronically.

5. The flying apparatus of claim 1, comprising:

at least one main wing disposed between the front rotor-fixing support and the rear rotor-fixing support and configured to provide lift and be coupled to a fuselage.

6. The flying apparatus of claim 5, further comprising:

a plurality of assistant lift fans, laterally disposed at both sides of the at least one main wing and configured to assist a vertical flight and balance control of the flying apparatus.

7. The flying apparatus of claim 1, wherein a diameter of a front propeller of the front tiltrotor is less than a length of the front rotor-fixing support, or a diameter of a rear propeller of the rear tiltrotor is less than a length of the rear rotor-fixing support.

8. The flying apparatus of claim 1, further comprising:

a retractable propeller, disposed at the linear support and configured to assist a vertical flight and balance control of the flying apparatus and retract into the linear support during a horizontal flight of the flying apparatus.

9. The flying apparatus of claim 1, further comprising:

a wing platform complex, disposed beneath the structural frame and configured to accommodate a power system and a transmission mechanism, and connect the structural frame to a fuselage;

wherein the power system is configured to provide power for the front tiltrotor and the rear tiltrotor.

10. The flying apparatus of claim 9, wherein the power system is powered by any one or any combination of following power resources: fuel, electricity, solar power, wind power, and nuclear power.

11. The flying apparatus of claim 9, wherein the power system comprises:

an electric generator; and a gas engine assembly, configured to drive the electric generator;

wherein the gas engine assembly comprises two gas engines disposed on two sides divided by a central line of the structural frame.

12. The flying apparatus of claim 9, wherein the transmission mechanism is configured to transmit power and control signals among the power system, an operation system, and the tandem tiltrotor system, to control a flight state of the flying apparatus, wherein the power system and the transmission mechanism are disposed on opposite sides of the wing platform complex.

13. The flying apparatus of claim 1, wherein the front rotor-fixing support comprises a front stabilizer, configured to control flight directions during a vertical flight, or the rear rotor-fixing support comprises a rear stabilizer, configured to control flight directions during a horizontal flight.

14. An aircraft, comprising:

a flying apparatus configured to carry a fuselage;

wherein the flying apparatus comprises:

a tandem tiltrotor system, comprising a front tiltrotor and a rear tiltrotor; and a structural frame, configured to support the tandem tiltrotor system and comprising a front rotor-fixing support, a rear rotor-fixing support, and a linear support configured to connect and fix the front rotor-fixing support and the rear rotor-fixing support;

wherein the front tiltrotor is disposed at a middle portion of the front rotor-fixing support; and the rear tiltrotor is disposed at a middle portion of the rear rotor-fixing support, wherein the front tiltrotor and the rear tiltrotor are arranged in a tandem manner, wherein the front tiltrotor is configured to tilt at a front tilt angle to a gravity direction to control a flight of the flying apparatus, and the rear tiltrotor is configured to tilt at a rear tilt angle to the gravity direction to control the flight of the flying apparatus, wherein the front tiltrotor is configured to, in response to a failure of the rear tiltrotor, maintain controllability of the flying apparatus, to ensure a controlled flight or a safe landing, or the rear tiltrotor is configured to, in response to a failure of the front tiltrotor, maintain controllability of the flying apparatus, to ensure a controlled flight or a safe landing.

15. The aircraft of claim 14, further comprising:

at least one main wing, disposed between the front rotor-fixing support and the rear rotor-fixing support and configured to be coupled to the fuselage.

16. The aircraft of claim 15, further comprising:

a plurality of assistant lift fans, laterally disposed at both sides of the at least one main wing and configured to assist a vertical flight and balance control of the aircraft; or a retractable propeller, disposed at the linear support and configured to assist a vertical flight and balance control of the aircraft and retract into the linear support during a horizontal flight of the aircraft.

17. The aircraft of claim 14, wherein the flying apparatus is detachable from the fuselage.

18. The aircraft of claim 14, wherein the flying apparatus is controlled by an external control terminal; or the flying apparatus is self-controlled.

19. A method for controlling flight of an aircraft, comprising:

receiving, from a control terminal, an instruction reflecting a flight trajectory; and controlling, in accordance with the instruction, a front tilt angle, a front rotation speed, and a front rotation direction of a front tiltrotor, and a rear tilt angle, a rear rotation speed, and a rear rotation direction of a rear tiltrotor, wherein the front tiltrotor is disposed at a middle portion of a front rotor-fixing support; and the rear tiltrotor is disposed at a middle portion of a rear rotor-fixing support, the front tiltrotor and the rear tiltrotor are arranged in a tandem manner, and the front tiltrotor is configured to tilt at the front tilt angle to a gravity direction to control a flight of the aircraft, and the rear tiltrotor is configured to tilt at the rear tilt angle to the gravity direction to control the flight of the aircraft, and in response to a failure of one of the front tiltrotor or the rear tiltrotor, controlling a remaining operable tiltrotor to maintain controllability of the aircraft, to ensure a controlled flight or a safe landing.

* * * * *